US011240596B2

(12) United States Patent
Wexler et al.

(10) Patent No.: US 11,240,596 B2
(45) Date of Patent: Feb. 1, 2022

(54) SYSTEMS AND METHODS FOR DIRECTING AUDIO OUTPUT OF A WEARABLE APPARATUS

(71) Applicant: OrCam Technologies Ltd., Jerusalem (IL)

(72) Inventors: Yonatan Wexler, Jerusalem (IL); Amnon Shashua, Mevaseret Zion (IL)

(73) Assignee: OrCam Technologies Ltd., Jerusalem (IL)

( * ) Notice: Subject to any disclaimer, the term of this patent is extended or adjusted under 35 U.S.C. 154(b) by 154 days.

(21) Appl. No.: 16/787,124

(22) Filed: Feb. 11, 2020

(65) Prior Publication Data
US 2020/0221218 A1 Jul. 9, 2020

Related U.S. Application Data

(63) Continuation of application No. 15/622,611, filed on Jun. 14, 2017, now Pat. No. 10,602,264.
(Continued)

(51) Int. Cl.
*G06K 9/00* (2006.01)
*H04R 1/40* (2006.01)
(Continued)

(52) U.S. Cl.
CPC ............. *H04R 1/403* (2013.01); *G06F 3/011* (2013.01); *G06F 3/012* (2013.01); *G06F 3/165* (2013.01);
(Continued)

(58) Field of Classification Search
CPC .... H04R 1/403; H04R 1/345; H04R 2499/11; G06F 3/011; G06F 3/012; G06F 3/165; G06K 9/00335; H04N 7/185
See application file for complete search history.

(56) References Cited

U.S. PATENT DOCUMENTS 6,766,028 B1 * 7/2004 Dickens .................. H04S 3/004
381/310
7,634,092 B2 * 12/2009 McGrath ................... H04S 3/00
381/17
(Continued)

FOREIGN PATENT DOCUMENTS

WO WO 2015/068587 A1 5/2015

OTHER PUBLICATIONS

International Search Report and Written Opinion dated Sep. 29, 2017 in corresponding international application No. PCT/IB2017/000860, issued from the International Searching Authority (12 pages).

*Primary Examiner* — Avinash Yentrapati
(74) *Attorney, Agent, or Firm* — Finnegan, Henderson, Farabow, Garrett & Dunner, LLP

(57) ABSTRACT

The present disclosure relates to systems and methods for directing the audio output of a wearable device having a plurality of speakers. In one implementation, the system may include an image sensor configured to capture one or more images from an environment of the user of the wearable apparatus, a plurality of speakers, and at least one processing device. The at least one processing device may be configured to analyze the one or more images to determine at least one indicator of head orientation of the user of the wearable apparatus, select at least one of the plurality of speakers based on the at least one indicator of head orientation, and output the audio to the user of the wearable apparatus via the selected at least one of the plurality of speakers.

20 Claims, 29 Drawing Sheets

Related U.S. Application Data

(60) Provisional application No. 62/350,067, filed on Jun. 14, 2016.

(51) Int. Cl.
  *G06F 3/01*   (2006.01)
  *G06F 3/16*   (2006.01)
  *H04N 7/18*   (2006.01)
  *H04R 1/34*   (2006.01)

(52) U.S. Cl.
  CPC ......... *G06K 9/00335* (2013.01); *H04N 7/185* (2013.01); *H04R 1/345* (2013.01); *H04R 2499/11* (2013.01)

(56) References Cited

U.S. PATENT DOCUMENTS

| | | | | |
|---|---|---|---|---|
| 9,213,419 | B1* | 12/2015 | Cassidy | G06F 1/1694 |
| 9,277,343 | B1* | 3/2016 | Alexandrov | H04S 7/303 |
| 9,377,941 | B2* | 6/2016 | Nguyen | G06K 9/0057 |
| 9,521,497 | B2* | 12/2016 | Schuster | G06F 3/0346 |
| 9,584,946 | B1* | 2/2017 | Lyren | H04M 1/0202 |
| 9,693,009 | B2* | 6/2017 | Farrell | H04N 5/77 |
| 2002/0141597 | A1* | 10/2002 | Wilcock | G06F 3/167 |
| | | | | 381/61 |
| 2003/0016434 | A1* | 1/2003 | Torchigin | G02F 1/125 |
| | | | | 359/286 |
| 2006/0165242 | A1* | 7/2006 | Miki | H04R 3/02 |
| | | | | 381/59 |
| 2006/0251334 | A1* | 11/2006 | Oba | A61B 5/1122 |
| | | | | 382/275 |
| 2010/0026780 | A1* | 2/2010 | Tico | H04R 3/005 |
| | | | | 348/14.02 |
| 2011/0069841 | A1* | 3/2011 | Angeloff | H04S 7/303 |
| | | | | 381/17 |
| 2013/0041648 | A1* | 2/2013 | Osman | H04S 7/304 |
| | | | | 704/2 |
| 2013/0083976 | A1* | 4/2013 | Ragland | A61B 3/113 |
| | | | | 382/117 |
| 2013/0156201 | A1* | 6/2013 | Nakai | H04R 5/04 |
| | | | | 381/17 |
| 2013/0158993 | A1* | 6/2013 | Wilcock | G06F 3/167 |
| | | | | 704/235 |
| 2013/0169536 | A1* | 7/2013 | Wexler | G09B 21/008 |
| | | | | 345/158 |
| 2013/0191753 | A1* | 7/2013 | Sugiyama | G06F 3/165 |
| | | | | 715/727 |
| 2014/0003620 | A1* | 1/2014 | Rill | H04M 1/6091 |
| | | | | 381/86 |
| 2014/0270482 | A1* | 9/2014 | Chakraborty | G06K 9/00677 |
| | | | | 382/154 |
| 2014/0328505 | A1* | 11/2014 | Heinemann | G06F 3/017 |
| | | | | 381/303 |
| 2015/0256954 | A1* | 9/2015 | Carlsson | H04R 27/00 |
| | | | | 381/59 |
| 2016/0011768 | A1* | 1/2016 | Yim | G06F 1/3265 |
| | | | | 345/173 |
| 2016/0026853 | A1* | 1/2016 | Wexler | G06K 9/00288 |
| | | | | 382/103 |
| 2016/0080684 | A1* | 3/2016 | Farrell | H04N 9/8211 |
| | | | | 386/227 |
| 2017/0064363 | A1* | 3/2017 | Wexler | G06K 9/00308 |
| 2018/0146306 | A1* | 5/2018 | Benattar | H04W 4/80 |

\* cited by examiner

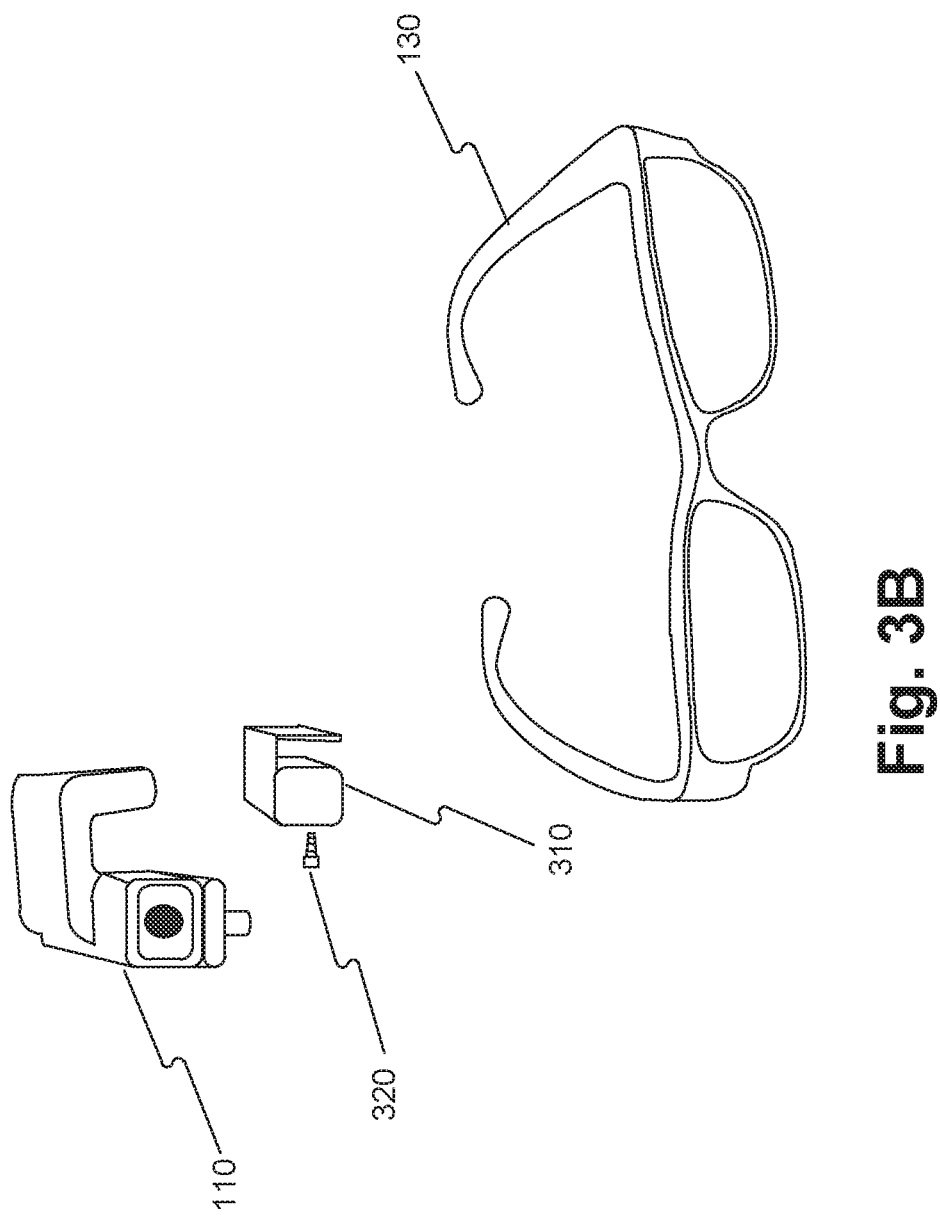

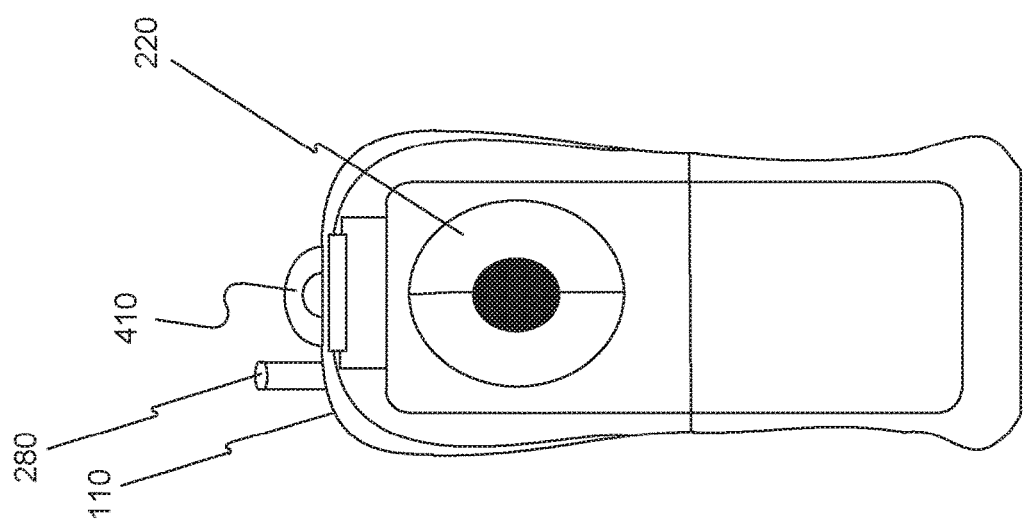

SYSTEMS AND METHODS FOR DIRECTING AUDIO OUTPUT OF A WEARABLE APPARATUS

CROSS REFERENCE TO RELATED APPLICATION

This application is a continuation of U.S. patent application Ser. No. 15/622,611, filed on Jun. 14, 2017, currently pending, which claims the benefit of priority of U.S. Provisional Patent Application No. 62/350,067, filed Jun. 14, 2016. The above-reference applications are incorporated herein by reference in their entireties.

BACKGROUND

Technical Field

This disclosure generally relates to systems and methods for directing the audio output of a wearable device having a plurality of speakers. More particularly, this disclosure relates to devices and methods for directing audio output to a speaker on a wearable device based on head orientation of a user.

Background Information

Today, technological advancements make it possible for wearable devices to automatically capture images and store information that is associated with the captured images. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image data.

Even though users can capture images with their smartphones and some smartphone applications can process the captured images, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment, identifying persons and objects they encounter, and providing feedback to the users about their surroundings and activities.

Certain lifelogging apparatuses may provide audio feedback to the wearer. However, audio is usually conveyed to a user with headphones, which may be cumbersome to wear and distracting to the user. Audio may also be conveyed with one or more speakers; however, existing apparatuses usually output audio into the environment indiscriminately. Therefore, there is a need for apparatuses and methods for directing the audio output of a wearable device, such as a lifelogging apparatus.

SUMMARY

Embodiments consistent with the present disclosure provide devices and methods for providing audio to a user of the wearable apparatus. For example, a wearable apparatus for providing audio to a user of the wearable apparatus may comprise an image sensor configured to capture one or more images from an environment of the user of the wearable apparatus; a plurality of speakers; and at least one processing device. The at least one processing device may be configured to analyze the one or more images to determine at least one indicator of head orientation of the user of the wearable apparatus, select at least one of the plurality of speakers based on the at least one indicator of head orientation, and output the audio to the user of the wearable apparatus via the selected at least one of the plurality of speakers.

In another embodiment, a method for providing audio to a user of a wearable apparatus may comprise capturing, via an image sensor included in the wearable apparatus, one or more images from an environment of the user of the wearable apparatus. The method may further include analyzing, via at least one processing device included in the wearable apparatus, the one or more images to determine at least one indicator of head orientation of the user of the wearable apparatus and selecting, via, the at least one processing device, at least one of a plurality of speakers included in the wearable apparatus based on the at least one indicator of head orientation. The method may further include outputting the audio to the user of the wearable apparatus via the selected at least one of the plurality of speakers.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 3B is an exploded view of the example of the wearable apparatus shown in FIG. 3A.

FIG. 4A is a schematic illustration of an example of the wearable apparatus shown in FIG. 1B from a first viewpoint.

DETAILED DESCRIPTION

Figure 1A:
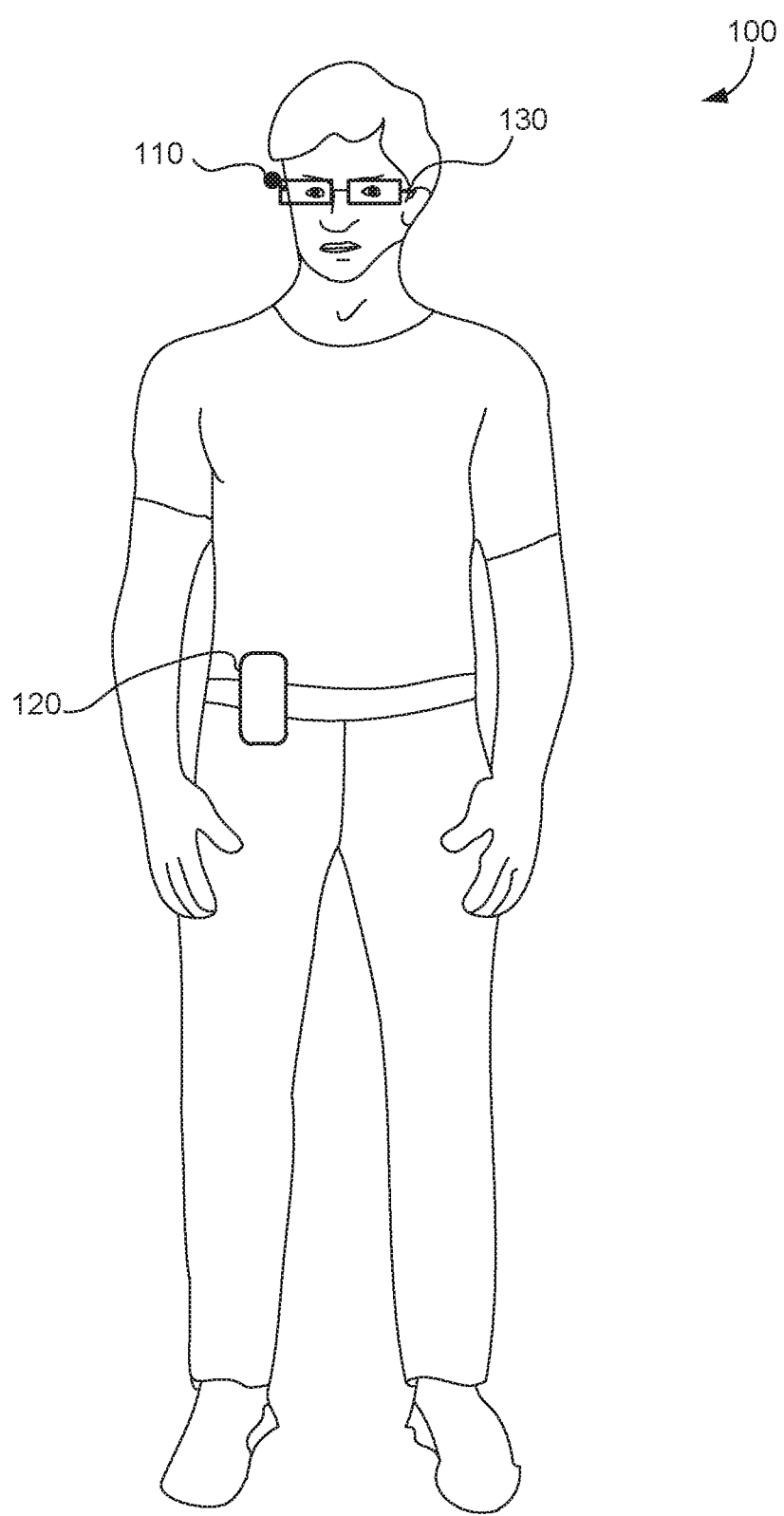
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Embodiments of the present disclosure provide systems and methods that may direct audio output of a wearable apparatus. For example, systems and methods of the present disclosure may direct audio output of a wearable apparatus based on at least one indicator of head orientation of a user. This may ensure that the audio output is directed to a speaker such that the user may hear the audio. This may further ensure that the output is directed to a speaker such that a minimal amount of audio is transmitted to the environment, which may include other people. Accordingly, systems and methods consistent with the present disclosure may help to preserve the privacy of a user's audio transmissions as well as minimize distractions to others.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or no lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
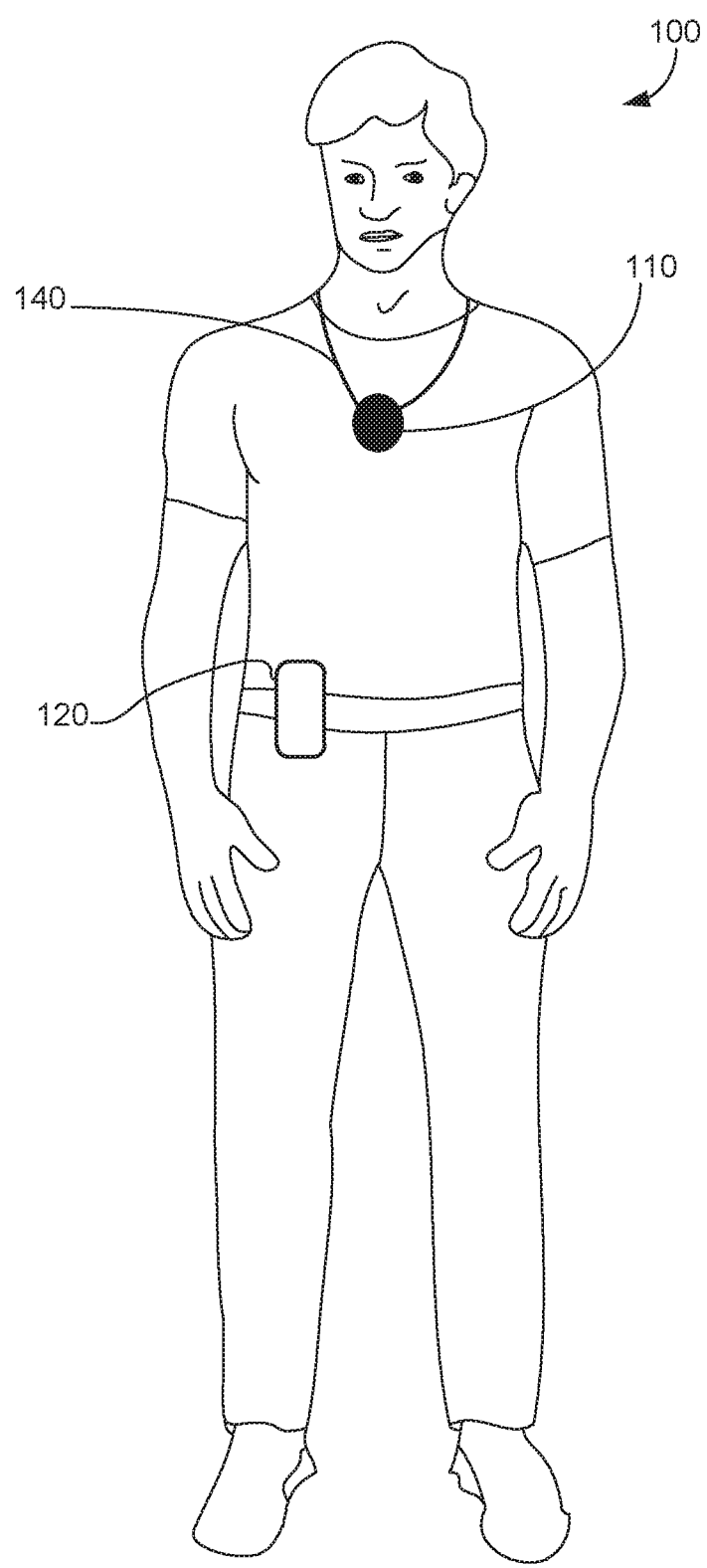
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
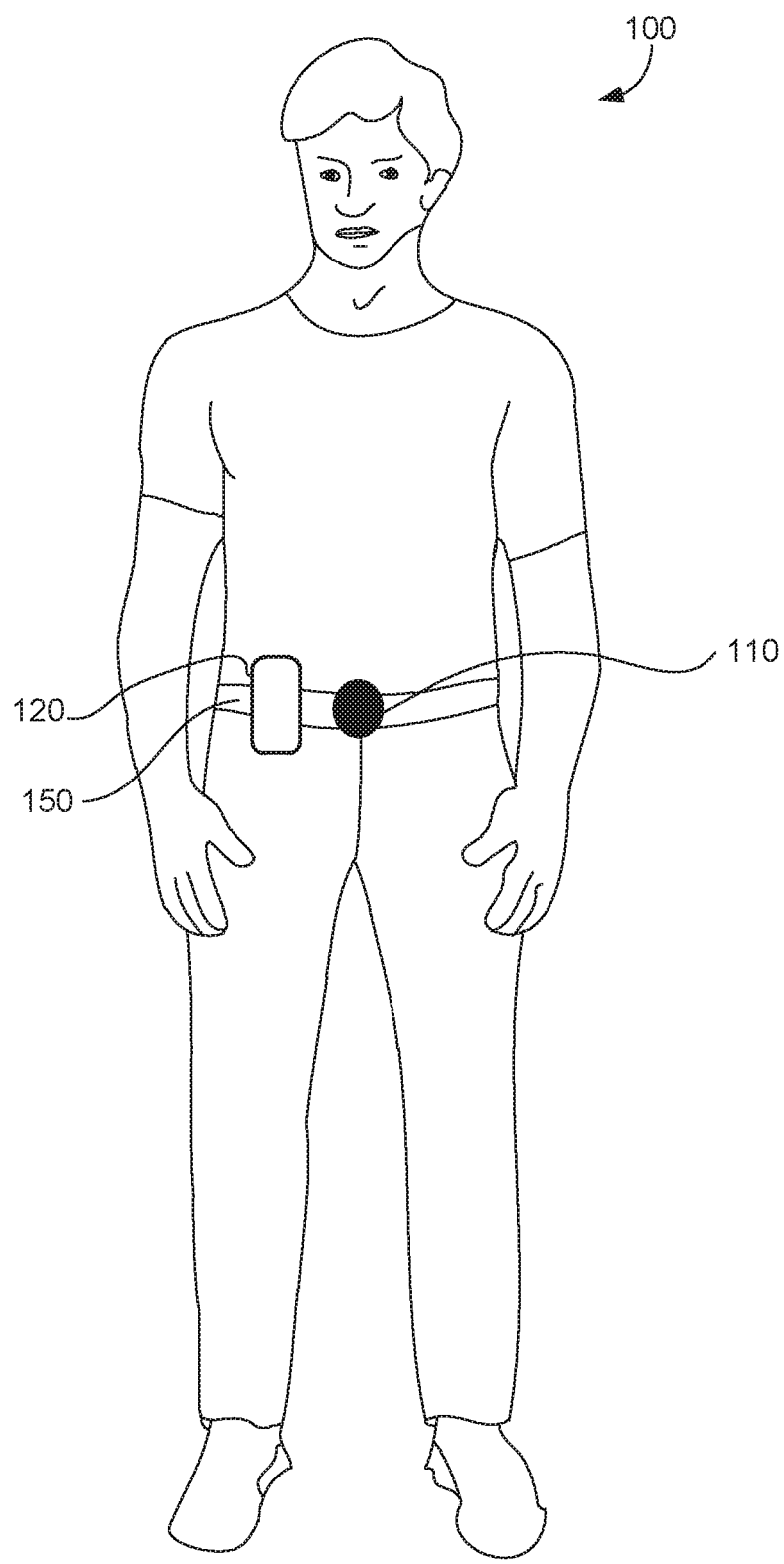
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
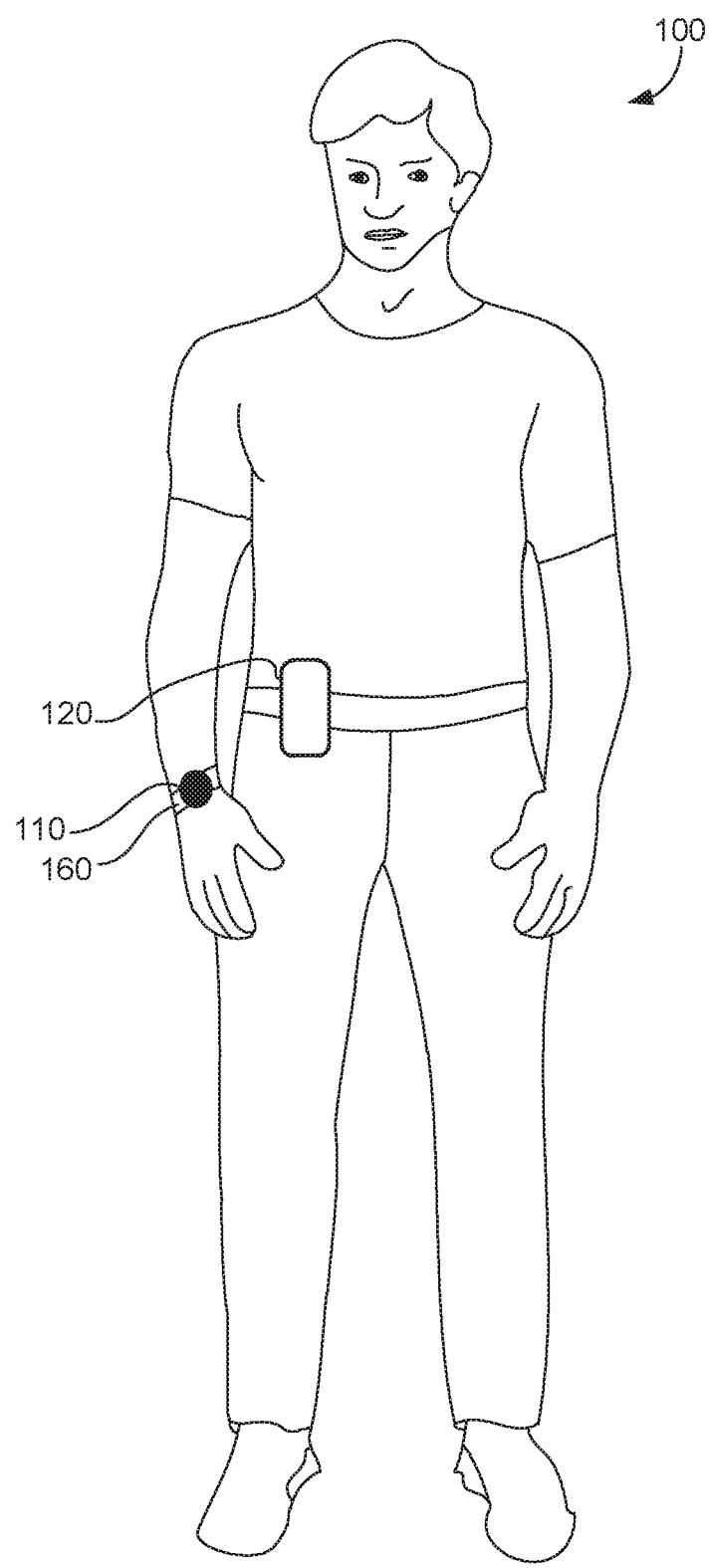
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger or orientation.

Figure 2:
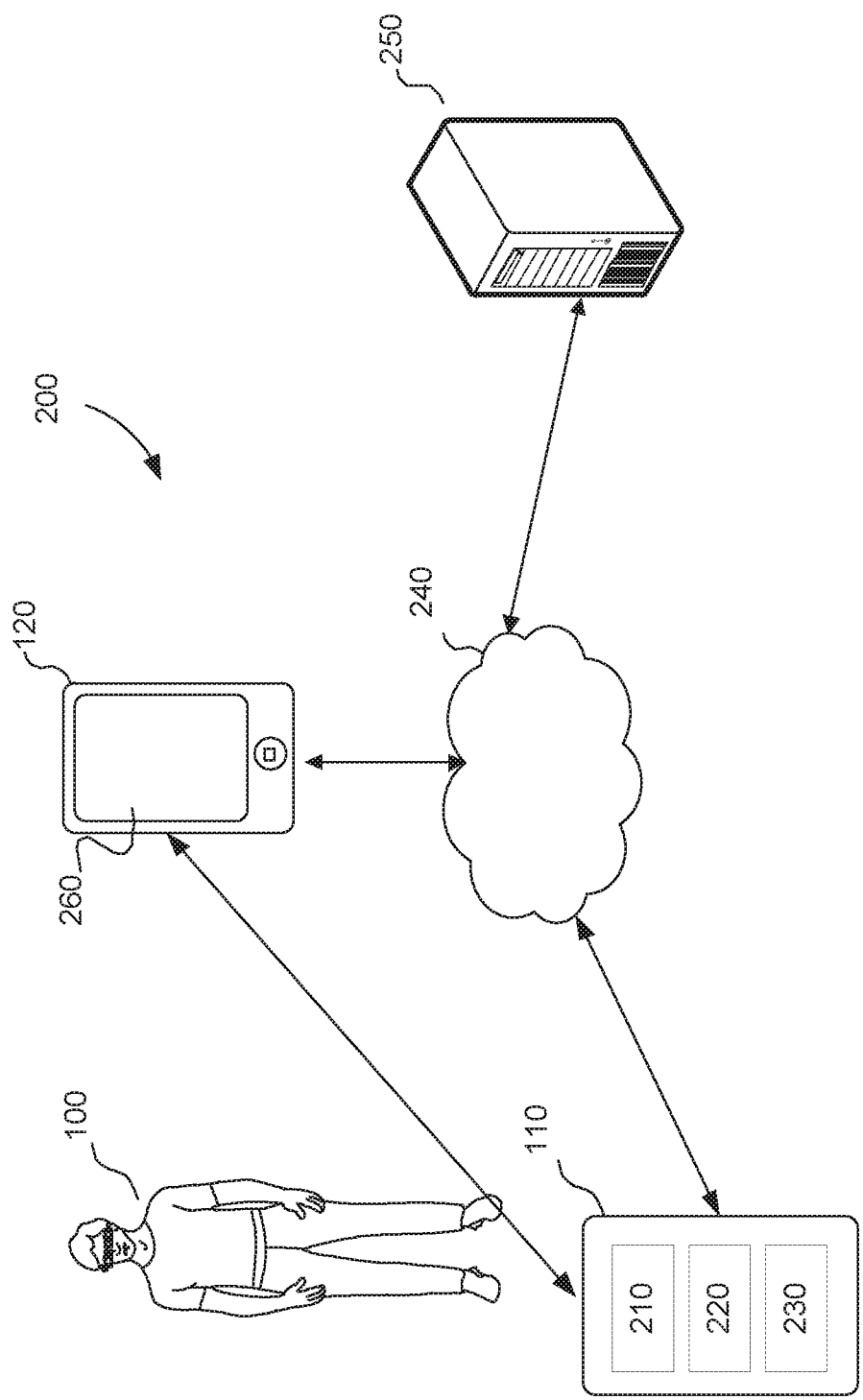
FIG. 2 is a schematic illustration of an example system consistent with the disclosed embodiments.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify at least one orientation indicator present in the image data, and perform an action and/or provide feedback to a user 100, based at least in part on the identification of the least one indicator. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on at least one orientation indicator identified in the image data. In some embodiments, at least one orientation indicator may include a gesture performed by user 100 involving a portion of a body part of user 100. Further, consistent with some embodiments, at least one orientation indicator may include a visual indicator of orientation within the image, e.g., a location of an ear of the user indicating an orientation of the user's head. Additionally, in some embodiments, apparatus 110 may include a feedback outputting unit 230 for producing an output of information to user 100. Feedback outputting unit 230 may include one or more speakers and/or one or more sound propagation guides, as described in greater detail below.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate directly with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-filed capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a commercial product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 3A:
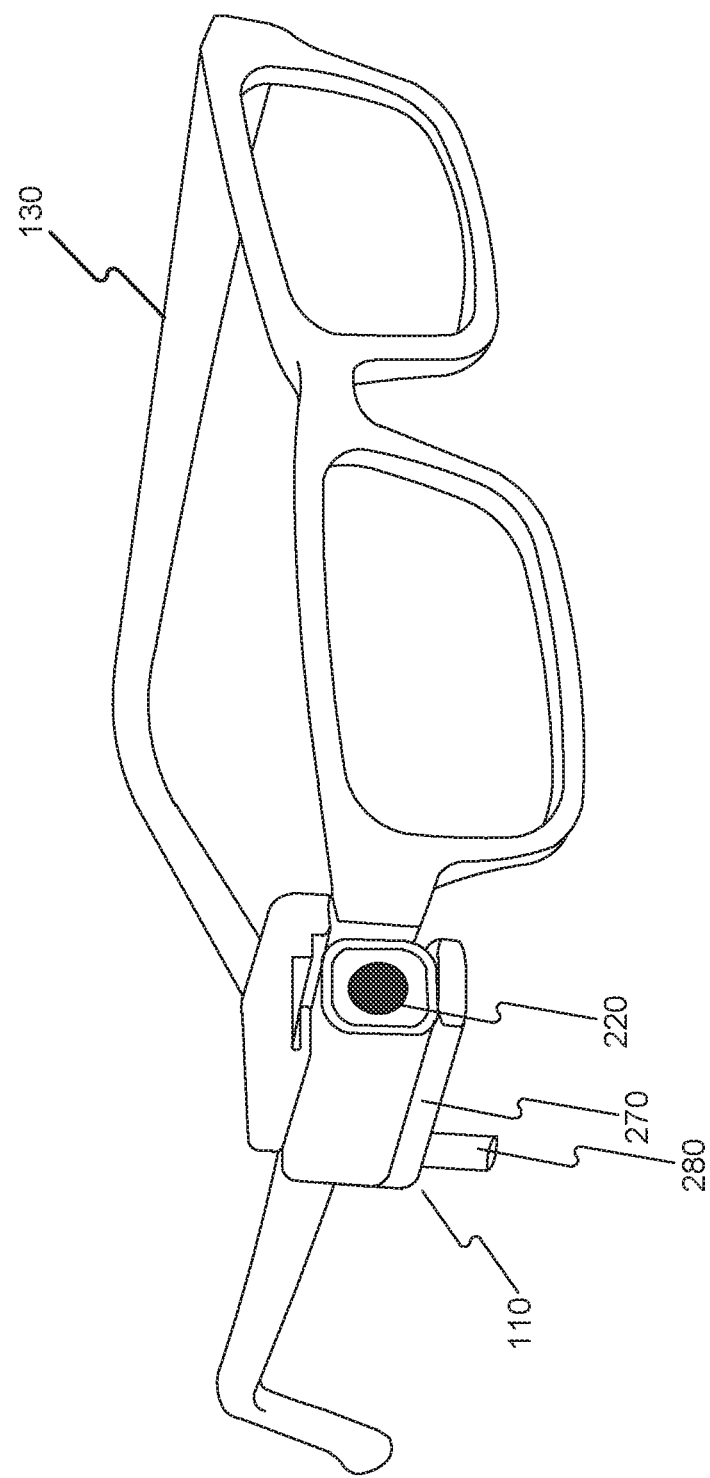
FIG. 3A is a schematic illustration of an example of the wearable apparatus shown in FIG. 1A.

An example of wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

As further depicted in FIG. 3A, apparatus 110 may further include an accelerometer 270 and a sound propagation guide 280 with an associated speaker (not shown). Accelerometer 270 may be used to determine one or more orientation indicators. In this example of FIG. 3A, the output from accelerometer 270 may be used to estimate the direction of the head of user 100. Alternatively or concurrently, the output from accelerometer 270 may be used to estimate the direction of the gravitation force, from which the direction of the head of user 100 may be determined.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a first viewpoint. The viewpoint shown in FIG. 4A is from the front of apparatus 110. Apparatus 110 includes an image sensor 220, a sound propagation guide 280 with an associated speaker (not shown), a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

Figure 4B:
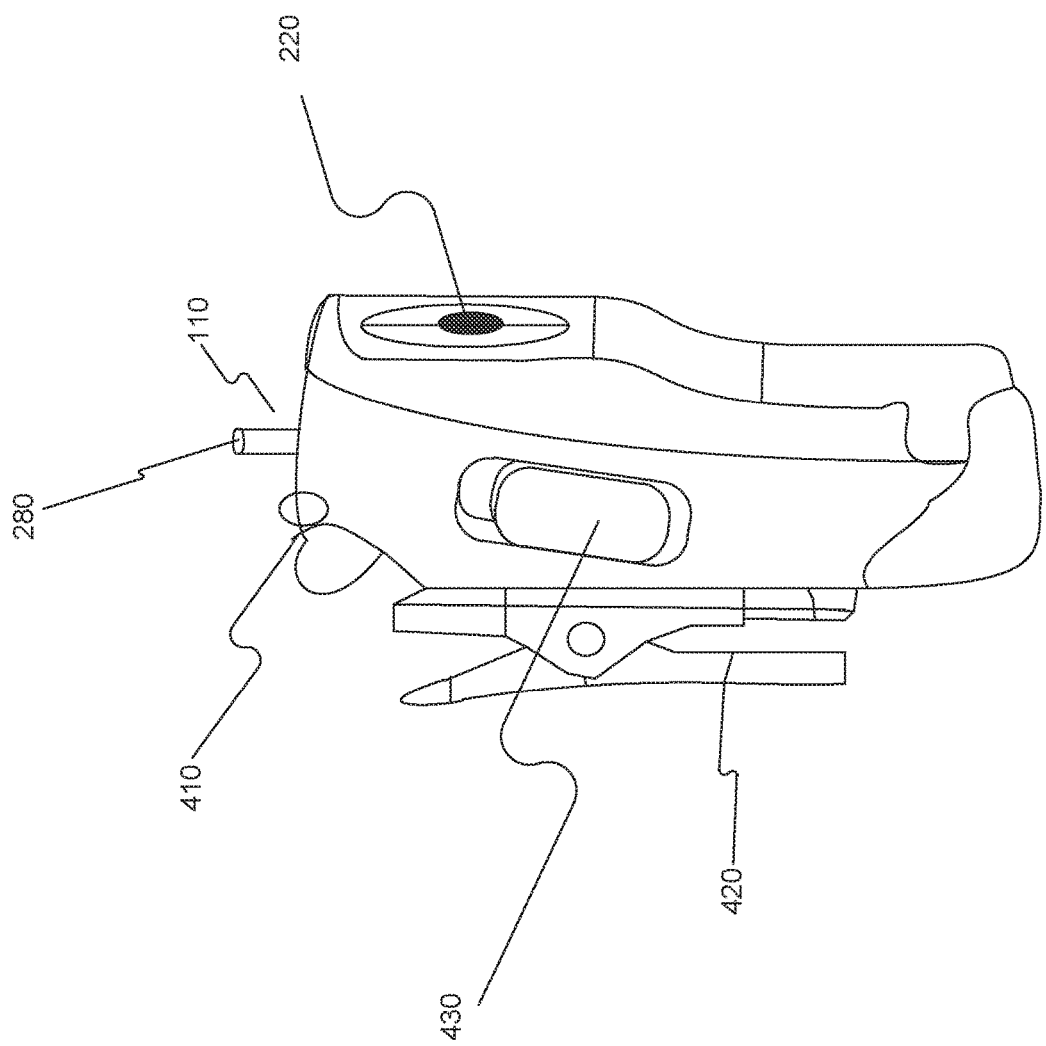
FIG. 4B is a schematic illustration of the example of the wearable apparatus shown in FIG. 1B from a second viewpoint.

FIG. 4B is a schematic illustration of the example of a second embodiment of apparatus 110, from a second viewpoint. The viewpoint shown in FIG. 4B is from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and reengaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
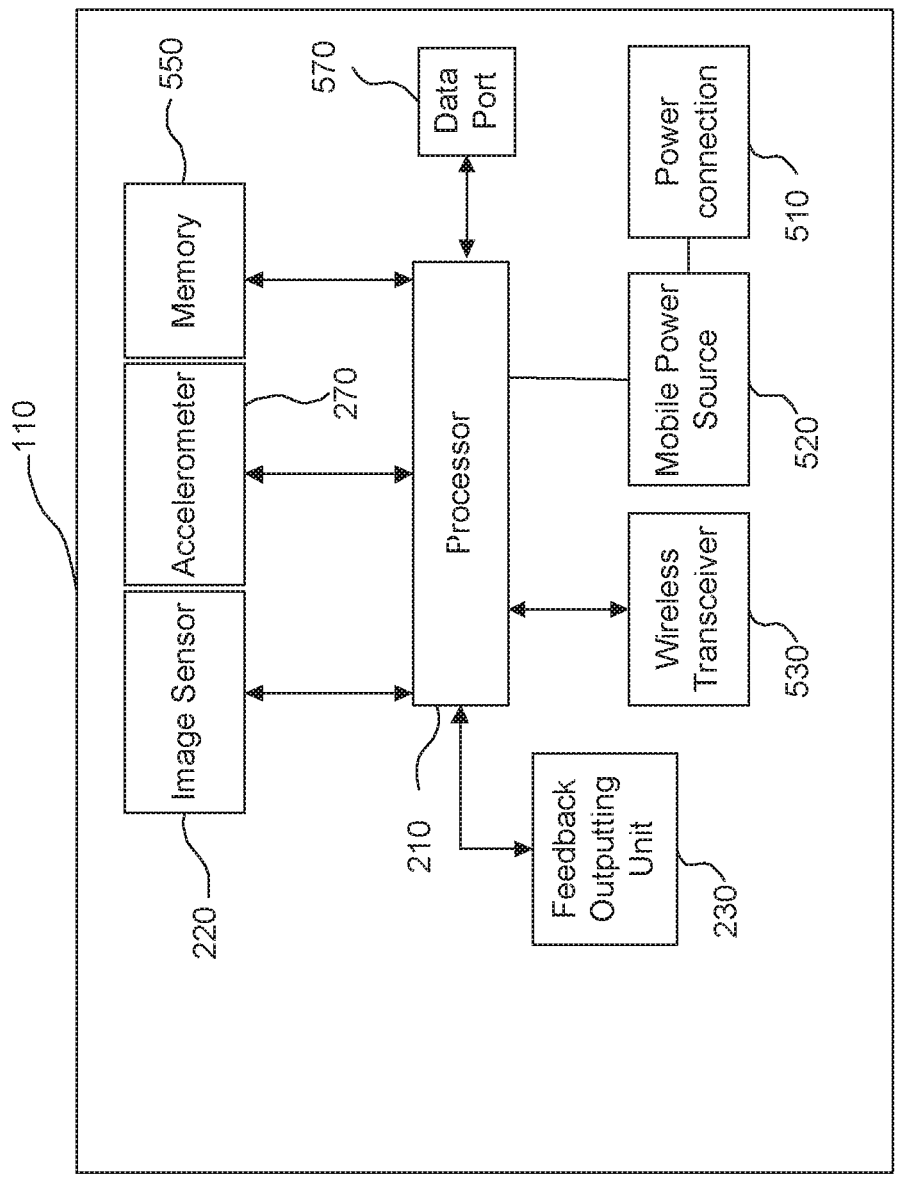
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, an accelerometer 270, a memory 550, a processor 210, a feedback outputting unit 230, a wireless transceiver 530, and a mobile power source 520. In other embodiments, apparatus 110 may also include buttons, other sensors such as a microphone, and inertial measurements devices such as gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 may detect images including at least one orientation indicator related to the user and perform an action and/or provide an output of information to a user via feedback outputting unit 230.

In another embodiment, processor 210 may change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. In another example, processor 210 may detect that one or more body parts of user 100 are not fully in view. Responsive thereto, processor 210 may adjust the aiming direction of image sensor 220 to capture at least one orientation indicator for the one or more body parts. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data. For example, feedback outputting unit 230 may include a plurality of speakers and may further include one or more sound propagation guides associated therewith.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise speakers (with or without sound propagation guides), audio headphones, a hearing aid type device, a speaker, a bone conduction headphone, interfaces that provide tactile cues, vibrotactile stimulators, etc.

In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 520 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250. In other embodiments, wireless transceiver 530 may transmit data and instructions to an external feedback outputting unit 230.

Figure 5B:
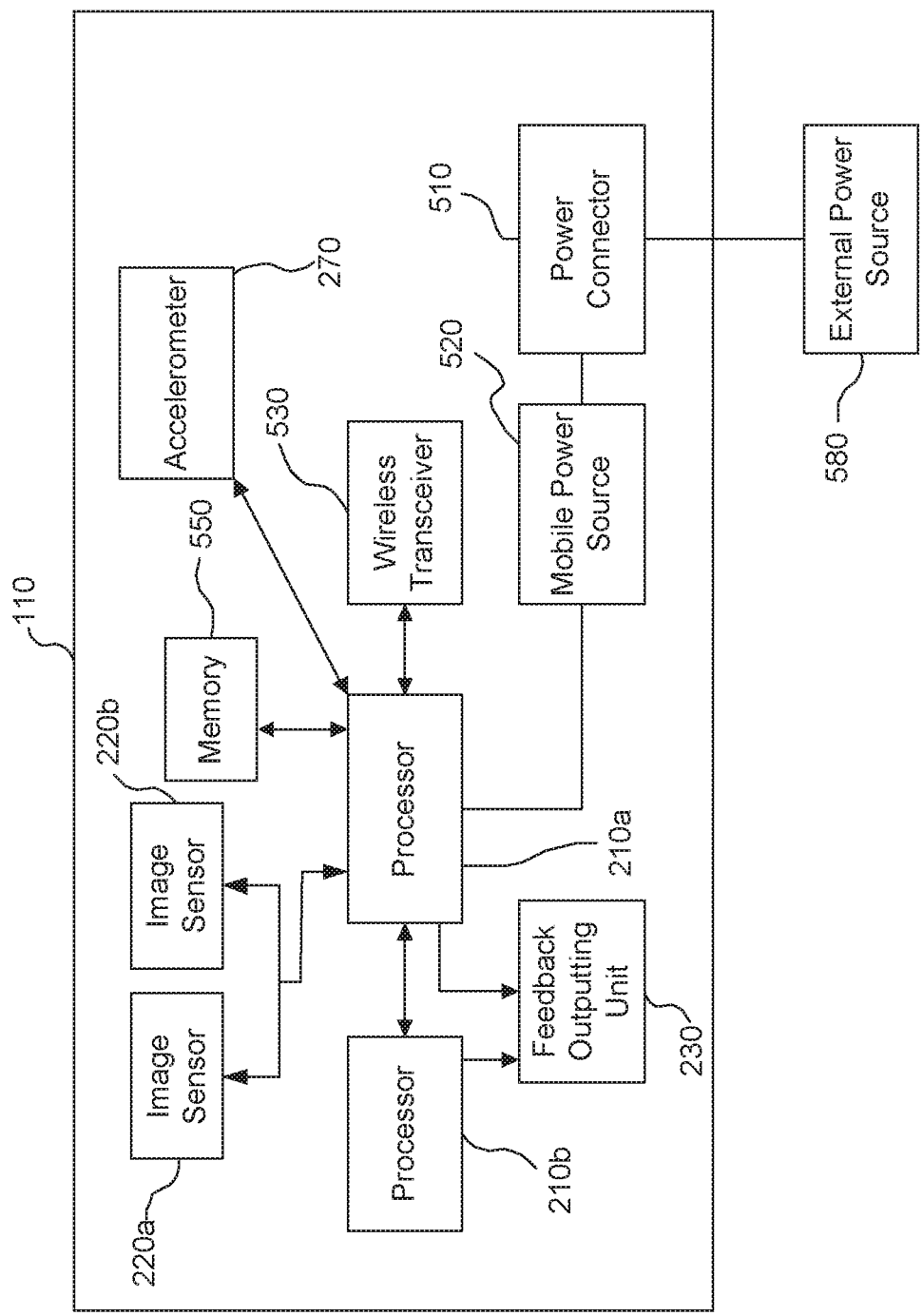
FIG. 5B is a block diagram illustrating an example of the components of a wearable apparatus according to a second embodiment.

FIG. 5B is a block diagram illustrating the components of apparatus 110 according to another example embodiment. In some embodiments, apparatus 110 includes a first image sensor 220a, a second image sensor 220b, an accelerometer 270, a memory 550, a first processor 210a, a second processor 210b, a feedback outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on at least one orientation indicator, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

Figure 5C:
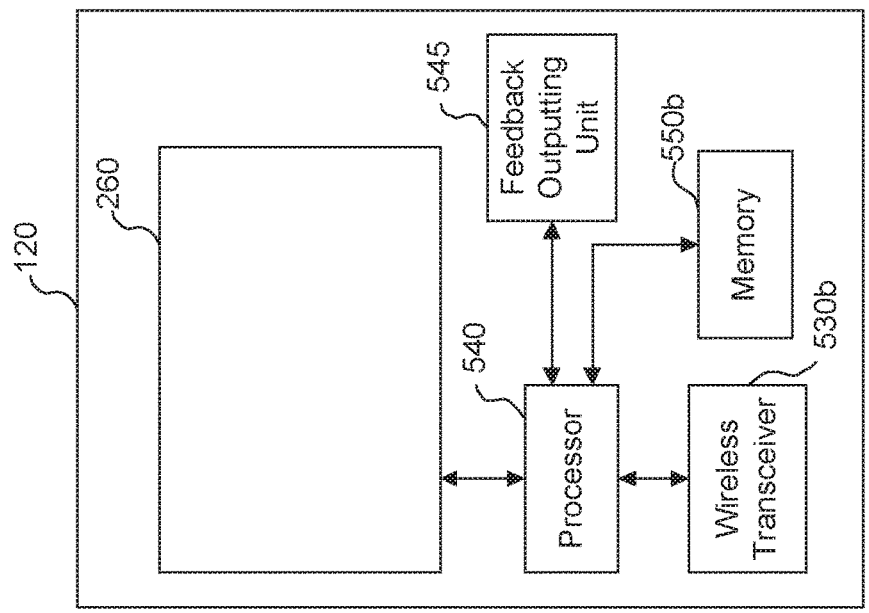
FIG. 5C is a block diagram illustrating an example of the components of a wearable apparatus according to a third embodiment.
Figure 5C:
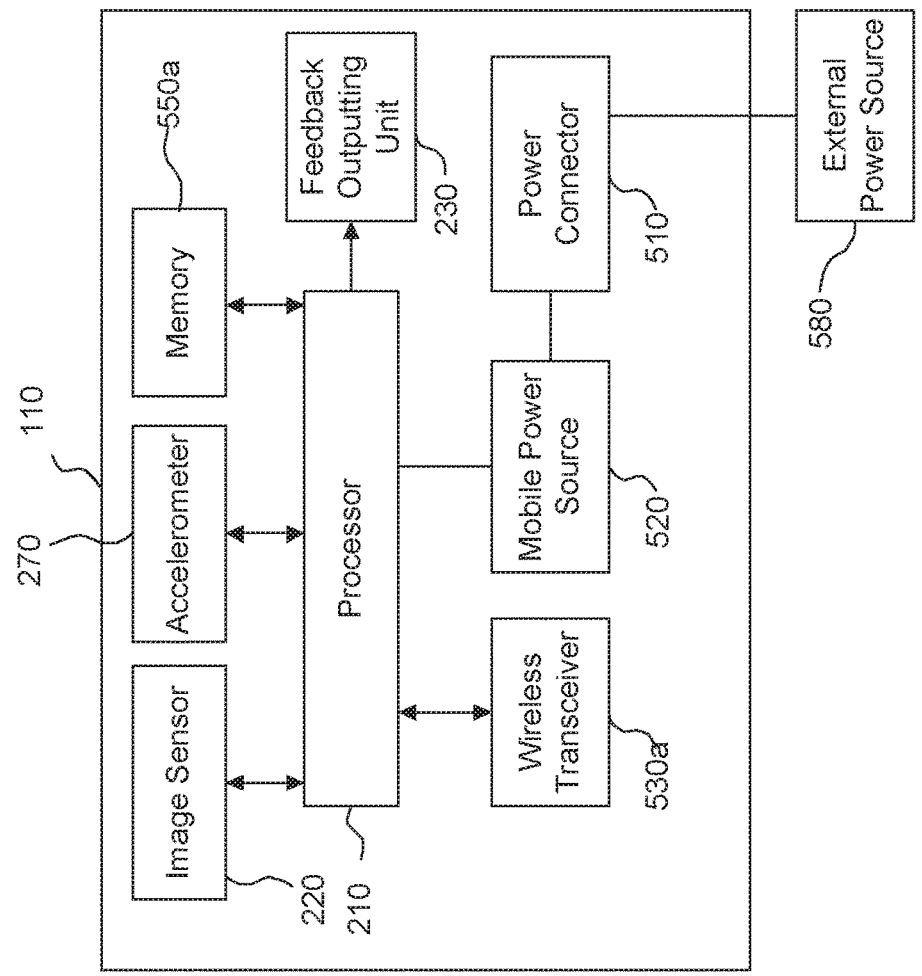

FIG. 5C is a block diagram illustrating the components of apparatus 110 according to another example embodiment including computing device 120. In this embodiment, apparatus 110 includes an image sensor 220, an accelerometer 270, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550b, a wireless transceiver 530b, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output, for example, in response to identification of an orientation indicator, on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual.

In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify at least one orientation indicator of a body part of user 100, for example, the head. Processor 210 and/or processor 540 may then processor the orientation indicator and direct audio output to one or more selected speakers (not shown) of apparatus 110 and/or computing device 120.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550a for storage in memory 550b. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. For example, in some embodiments, apparatus 110 may include a camera, a processor, and a wireless transceiver for sending data to another device. Therefore, the foregoing configurations are examples and, regardless of the configurations discussed above, apparatus 110 can capture, store, and/or process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger. In other embodiments, processor 210 or 540 may identify in the image data, one or more orientation indicators and direct audio output (or feedback) to one or more speakers selected using the at least one indicator.

Some embodiments of the present disclosure may include an apparatus securable to an article of clothing of a user. Such an apparatus may include two portions, connectable by a connector. A capturing unit may be designed to be worn on the outside of a user's clothing, and may include an image sensor for capturing images of a user's environment. The capturing unit may be connected to or connectable to a power unit, which may be configured to house a power source and a processing device. The capturing unit may be a small device including a camera or other device for capturing images. The capturing unit may be designed to be inconspicuous and unobtrusive, and may be configured to communicate with a power unit concealed by a user's clothing. The power unit may include bulkier aspects of the system, such as transceiver antennas, at least one battery, a processing device, etc. In some embodiments, communication between the capturing unit and the power unit may be provided by a data cable included in the connector, while in other embodiments, communication may be wirelessly achieved between the capturing unit and the power unit. Some embodiments may permit alteration of the orientation of an image sensor of the capture unit, for example to better capture images of interest.

An apparatus consistent with embodiments of the present disclosure may also include a plurality of speakers. For example, the speakers may be integrated with the wearable apparatus and/or may be housed in a unit separate from and in communication with the wearable apparatus (e.g., a cell phone, a tablet, or the like). In some embodiments, one or more of the speakers in the plurality of speakers may have an associated sound propagation guide.

Figure 6:
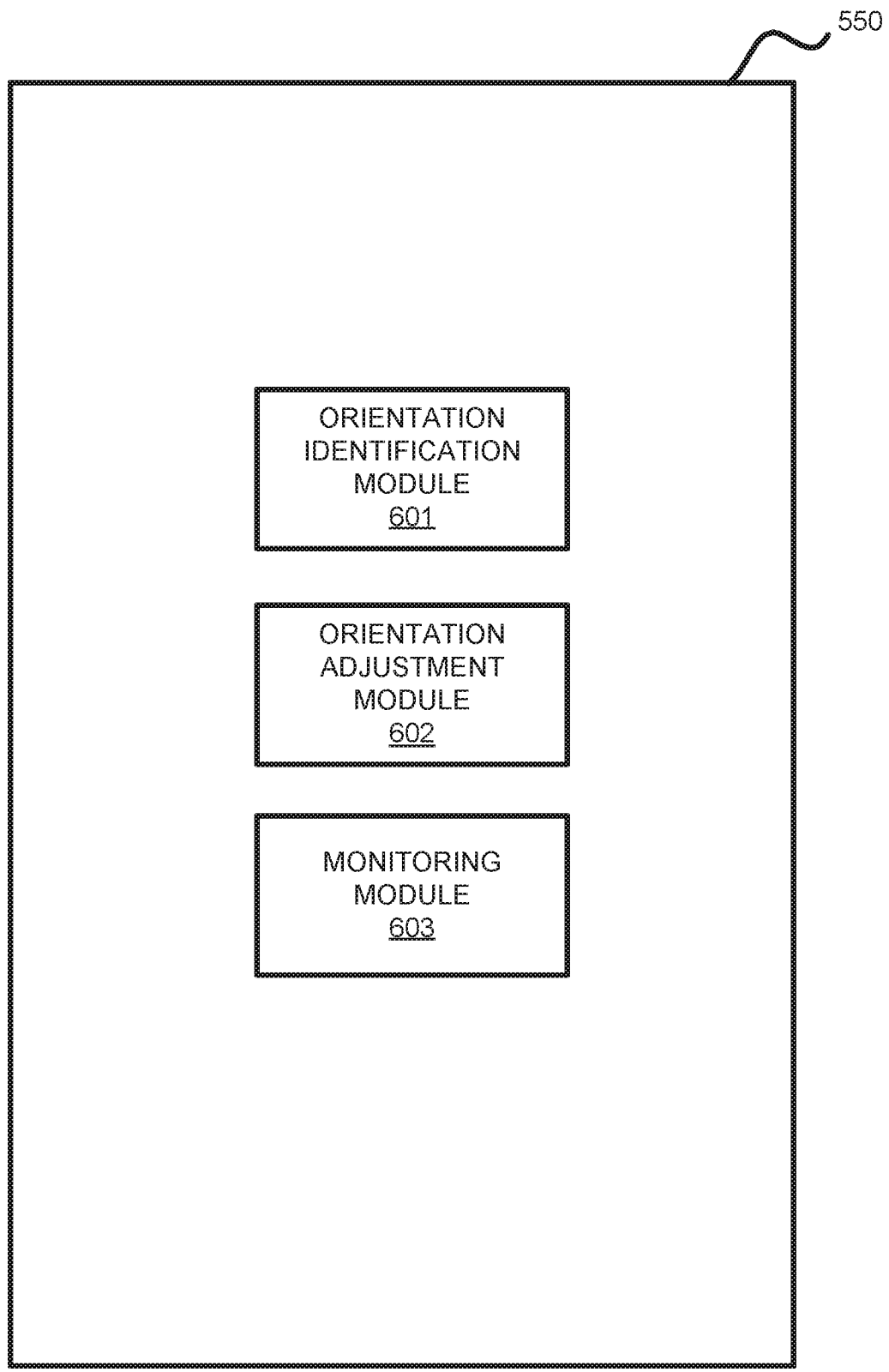
FIG. 6 illustrates an exemplary embodiment of a memory containing software modules consistent with the present disclosure.

FIG. 6 illustrates an exemplary embodiment of a memory containing software modules consistent with the present disclosure. Included in memory 550 are orientation identification module 601, orientation adjustment module 602, and motion tracking module 603. Modules 601, 602, 603 may contain software instructions for execution by at least one processing device, e.g., processor 210, included with a wearable apparatus. Orientation identification module 601, orientation adjustment module 602, and motion tracking module 603 may cooperate to provide orientation adjustment for a capturing unit incorporated into wireless apparatus 110.

Figure 7:
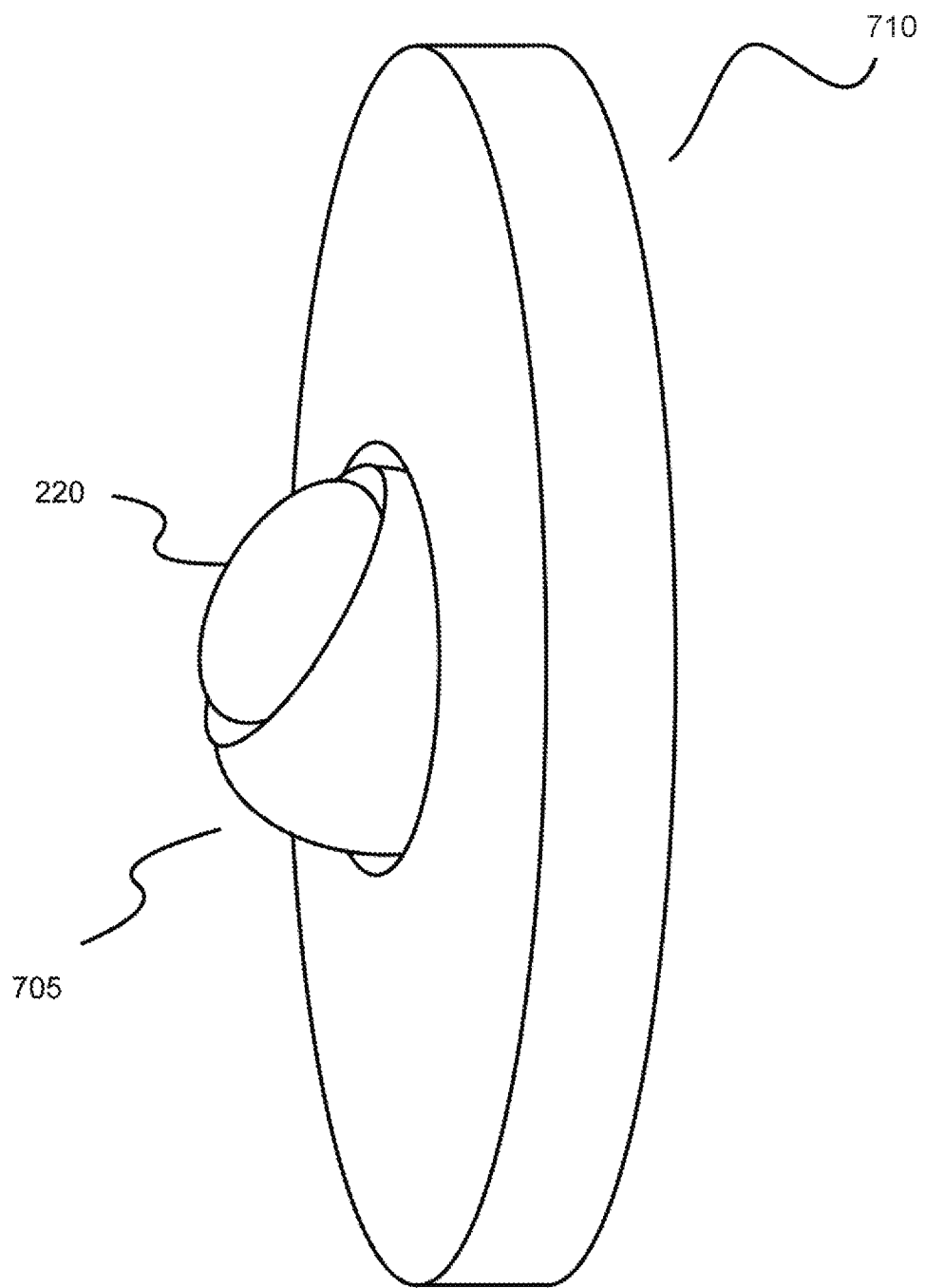
FIG. 7 is a schematic illustration of an embodiment of a wearable apparatus including an orientable image capture unit.

FIG. 7 illustrates an exemplary capturing unit 710 including an orientation adjustment unit 705. Orientation adjustment unit 705 may be configured to permit the adjustment of image sensor 220. As illustrated in FIG. 7, orientation adjustment unit 705 may include an eye-ball type adjustment mechanism. In alternative embodiments, orientation adjustment unit 705 may include gimbals, adjustable stalks, pivotable mounts, and any other suitable unit for adjusting an orientation of image sensor 220.

Image sensor 220 may be configured to be movable with the head of user 100 in such a manner that an aiming direction of image sensor 220 substantially coincides with a field of view of user 100. For example, as described above, a camera associated with image sensor 220 may be installed within capturing unit 710 at a predetermined angle in a position facing slightly upwards or downwards, depending on an intended location of capturing unit 710. Accordingly, the set aiming direction of image sensor 220 may match the field-of-view of user 100. In some embodiments, processor 210 may change the orientation of image sensor 220 using image data provided from image sensor 220. For example, processor 210 may recognize that a user is reading a book and determine that the aiming direction of image sensor 220 is offset from the text. That is, because the words in the beginning of each line of text are not fully in view, processor 210 may determine that image sensor 220 is tilted in the wrong direction. Responsive thereto, processor 210 may adjust the aiming direction of image sensor 220.

By way of further example, image sensor 220 may be configured to be movable with one or more body parts of user 100 in such a manner that the aiming direction of image sensor 220 substantially coincides with the one or more body parts. For example, as described above, a camera associated with image sensor 220 may be installed within capturing unit 710 at a predetermined angle in a position facing slightly upwards or downwards, depending on an intended location of capturing unit 710. Accordingly, the set aiming direction of image sensor 220 may be aimed at one or more body parts of user 100. In some embodiments, processor 210 may change the orientation of image sensor 220 using image data provided from image sensor 220. For example, processor 210 may recognize that one or more body parts of user 100 has moved and determine that the aiming direction of image sensor 220 is offset from the one or more body parts. That is, because a body part is not fully in view, processor 210 may determine that image sensor 220 is tilted in the wrong direction. Responsive thereto, processor 210 may adjust the aiming direction of image sensor 220.

Orientation identification module 601 may be configured to identify an orientation of an image sensor 220 of capturing unit 710. An orientation of an image sensor 220 may be identified, for example, by analysis of images captured by image sensor 220 of capturing unit 710, by tilt or attitude sensing devices within capturing unit 710, and by measuring a relative direction of orientation adjustment unit 705 with respect to the remainder of capturing unit 710.

Orientation adjustment module 602 may be configured to adjust an orientation of image sensor 220 of capturing unit 710. As discussed above, image sensor 220 may be mounted on an orientation adjustment unit 705 configured for movement. Orientation adjustment unit 705 may be configured for rotational and/or lateral movement in response to commands from orientation adjustment module 602. In some embodiments orientation adjustment unit 705 may be adjust an orientation of image sensor 220 via motors, electromagnets, permanent magnets, and/or any suitable combination thereof.

In some embodiments, monitoring module 603 may be provided for continuous monitoring. Such continuous monitoring may include tracking a movement of at least a portion of an object included in one or more images captured by the image sensor. For example, in one embodiment, apparatus 110 may track an object as long as the object remains substantially within the field-of-view of image sensor 220. In additional embodiments, monitoring module 603 may engage orientation adjustment module 602 to instruct orientation adjustment unit 705 to continually orient image sensor 220 towards an object of interest. For example, in one embodiment, monitoring module 603 may cause image sensor 220 to adjust an orientation to ensure that a certain designated object, for example, the face of a particular person or a body part of user 100, remains within the field-of-view of image sensor 220, even as that designated object moves about. In another embodiment, monitoring module 603 may continuously monitor an area of interest included in one or more images captured by the image sensor. For example, a user may be occupied by a certain task, for example, typing on a laptop, while image sensor 220 remains oriented in a particular direction and continuously monitors a portion of each image from a series of images to detect a trigger or other event. For example, image sensor 210 may be oriented towards a piece of laboratory equipment and monitoring module 603 may be configured to monitor a status light on the laboratory equipment for a change in status, while the user's attention is otherwise occupied.

In some embodiments consistent with the present disclosure, capturing unit 710 may include a plurality of image sensors 220. The plurality of image sensors 220 may each be configured to capture different image data. For example, when a plurality of image sensors 220 are provided, the image sensors 220 may capture images having different resolutions, may capture wider or narrower fields of view, and may have different levels of magnification. Image sensors 220 may be provided with varying lenses to permit these different configurations. In some embodiments, a plurality of image sensors 220 may include image sensors 220 having different orientations. Thus, each of the plurality of image sensors 220 may be pointed in a different direction to capture different images. The fields of view of image sensors 220 may be overlapping in some embodiments. The plurality of image sensors 220 may each be configured for orientation adjustment, for example, by being paired with an image adjustment unit 705. In some embodiments, monitoring module 603, or another module associated with memory 550, may be configured to individually adjust the orientations of the plurality of image sensors 220 as well as to turn each of the plurality of image sensors 220 on or off as may be required. In some embodiments, monitoring an object, person, or body part captured by an image sensor 220 may include tracking movement of the object across the fields of view of the plurality of image sensors 220.

Embodiments consistent with the present disclosure may include connectors configured to connect a capturing unit and a power unit of a wearable apparatus. Capturing units consistent with the present disclosure may include least one image sensor configured to capture images of an environment of a user. Power units consistent with the present disclosure may be configured to house a power source and/or at least one processing device. Connectors consistent with the present disclosure may be configured to connect the capturing unit and the power unit, and may be configured to secure the apparatus to an article of clothing such that the capturing unit is positioned over an outer surface of the article of clothing and the power unit is positioned under an inner surface of the article of clothing. Exemplary embodiments of capturing units, connectors, and power units consistent with the disclosure are discussed in further detail with respect to FIGS. 8-14.

Figure 8:
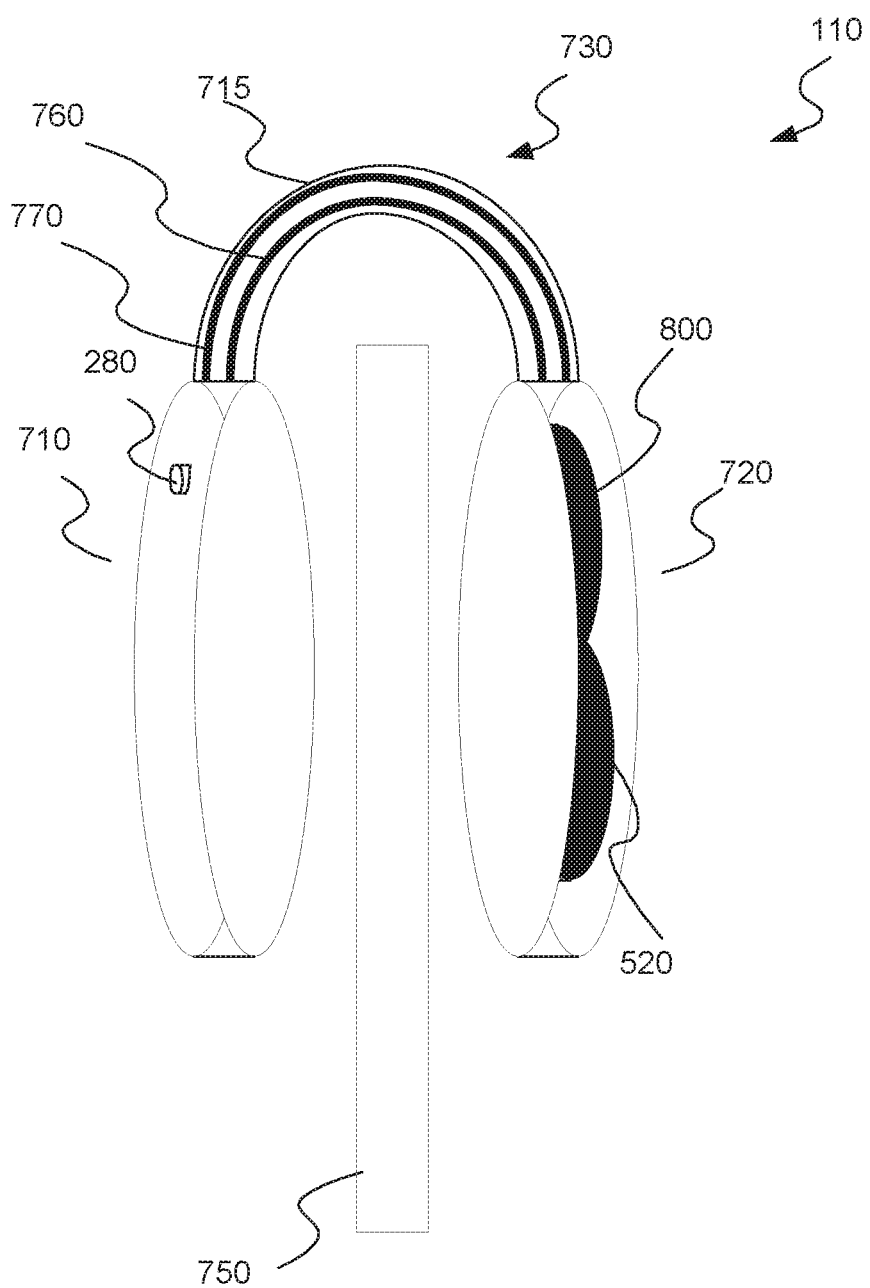
FIG. 8 is a schematic illustration of an embodiment of a wearable apparatus securable to an article of clothing consistent with the present disclosure.

FIG. 8 is a schematic illustration of an embodiment of wearable apparatus 110 securable to an article of clothing consistent with the present disclosure. As illustrated in FIG. 8, capturing unit 710 and power unit 720 may be connected by a connector 730 such that capturing unit 710 is positioned on one side of an article of clothing 750 and power unit 720 is positioned on the opposite side of the clothing 750. In some embodiments, capturing unit 710 may be positioned over an outer surface of the article of clothing 750 and power unit 720 may be located under an inner surface of the article of clothing 750. The power unit 720 may be configured to be placed against the skin of a user.

As depicted in FIG. 8, at least one sound propagation guide 280 with an associated speaker (not shown) may be positioned on the outer surface of clothing 750 with capturing unit 710. Alternatively or concurrently, at least one sound propagation guide (not shown) with an associated speaker (not shown) may be positioned on the inner surface of clothing 750 with power unit 720.

Capturing unit 710 may include an image sensor 220 and an orientation adjustment unit 705 (as illustrated in FIG. 7). Power unit 720 may include mobile power source 520 and processor 210. Power unit 720 may further include any combination of elements previously discussed that may be a part of wearable apparatus 110, including, but not limited to, wireless transceiver 530, feedback outputting unit 230, accelerometer 270, memory 550, and data port 570.

Connector 730 may include a clip 715 or other mechanical connection designed to clip or attach capturing unit 710 and power unit 720 to an article of clothing 750 as illustrated in FIG. 8. As illustrated, clip 715 may connect to each of capturing unit 710 and power unit 720 at a perimeter thereof, and may wrap around an edge of the article of clothing 750 to affix the capturing unit 710 and power unit 720 in place. Connector 730 may further include a power cable 760 and a data cable 770. Power cable 760 may be capable of conveying power from mobile power source 520 to image sensor 220 of capturing unit 710. Power cable 760 may also be configured to provide power to any other elements of capturing unit 710, e.g., orientation adjustment unit 705. Data cable 770 may be capable of conveying captured image data from image sensor 220 in capturing unit 710 to processor 800 in the power unit 720 and may be capable of conveying audio signals from processor 800 to one or more speakers, e.g., associated with sound propagation guide 280. Data cable 770 may be further capable of conveying additional data between capturing unit 710 and processor 800, e.g., control instructions for orientation adjustment unit 705.

Figure 9:
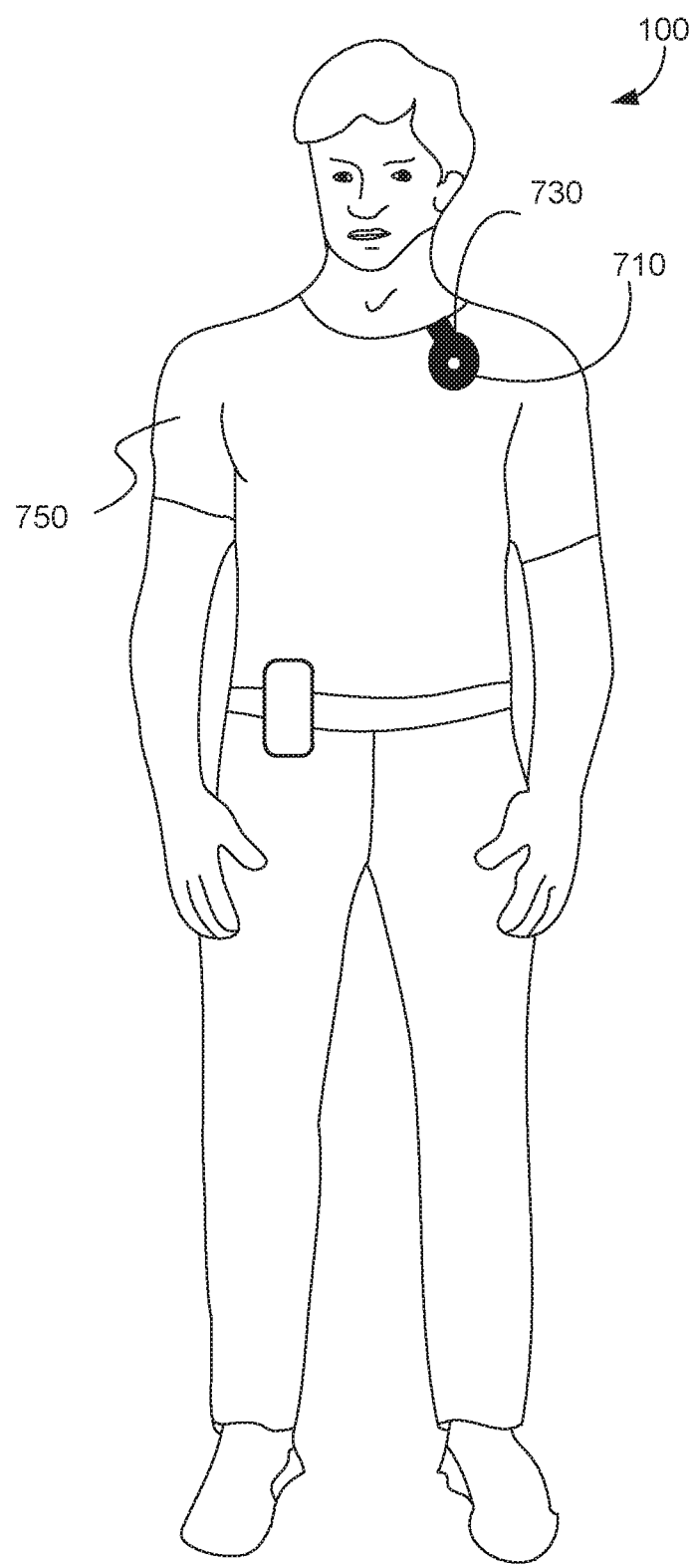
FIG. 9 is a schematic illustration of a user wearing a wearable apparatus consistent with an embodiment of the present disclosure.

FIG. 9 is a schematic illustration of a user 100 wearing a wearable apparatus 110 consistent with an embodiment of the present disclosure. As illustrated in FIG. 9, capturing unit 710 is located on an exterior surface of the clothing 750 of user 100. Capturing unit 710 is connected to power unit 720 (not seen in this illustration) via connector 730, which wraps around an edge of clothing 750.

In some embodiments, at least one sound propagation guide (not shown) with an associated speaker (not shown) may be positioned on the outer surface of clothing 750. Alternatively or concurrently, at least one sound propagation guide (not shown) with an associated speaker (not shown) may be positioned on the inner surface of clothing 750.

Figure 10:
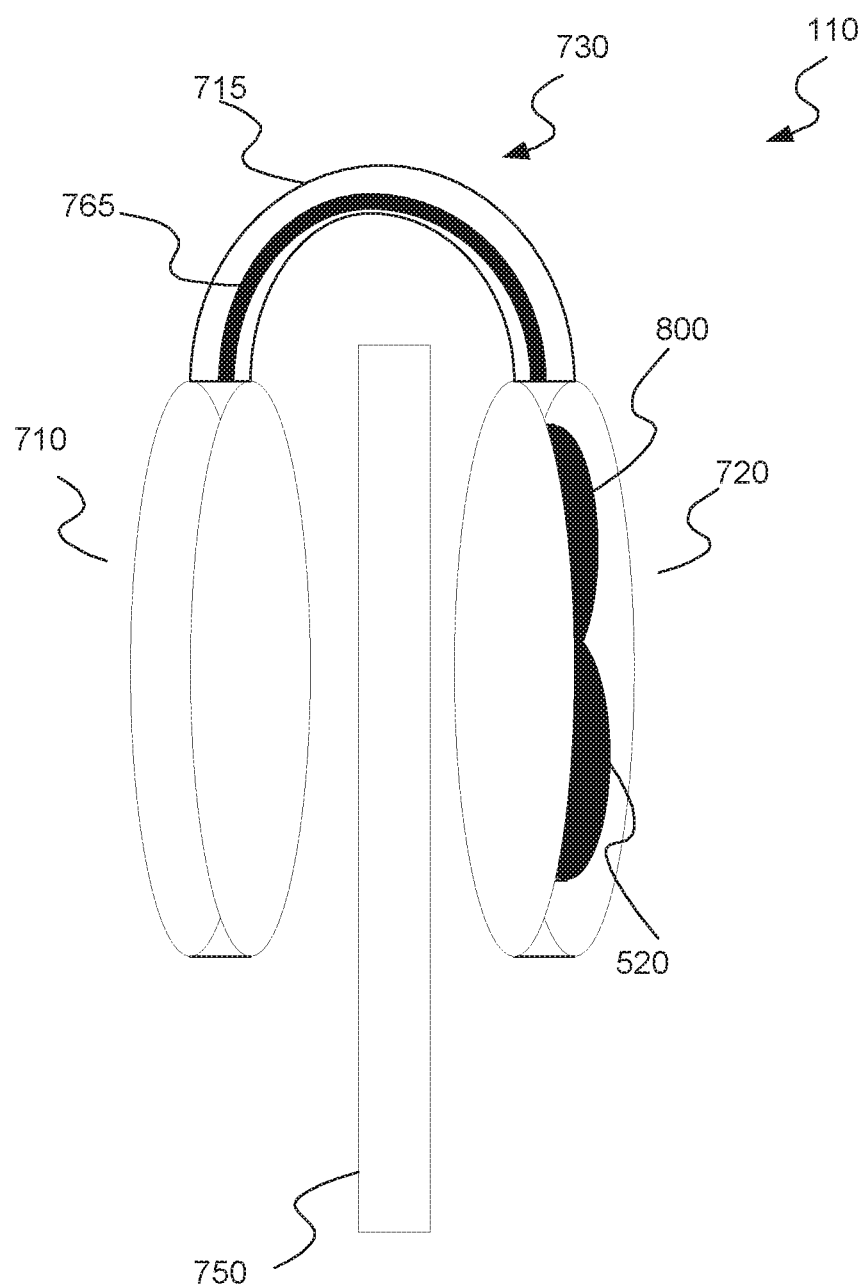
FIG. 10 is a schematic illustration of an embodiment of a wearable apparatus securable to an article of clothing consistent with the present disclosure.

In some embodiments, connector 730 may include a flexible printed circuit board (PCB). FIG. 10 illustrates an exemplary embodiment wherein connector 730 includes a flexible printed circuit board 765. Flexible printed circuit board 765 may include data connections and power connections between capturing unit 710 and power unit 720. Thus, in some embodiments, flexible printed circuit board 765 may serve to replace power cable 760 and data cable 770. In alternative embodiments, flexible printed circuit board 765 may be included in addition to at least one of power cable 760 and data cable 770. In various embodiments discussed herein, flexible printed circuit board 765 may be substituted for, or included in addition to, power cable 760 and data cable 770.

Figure 11:
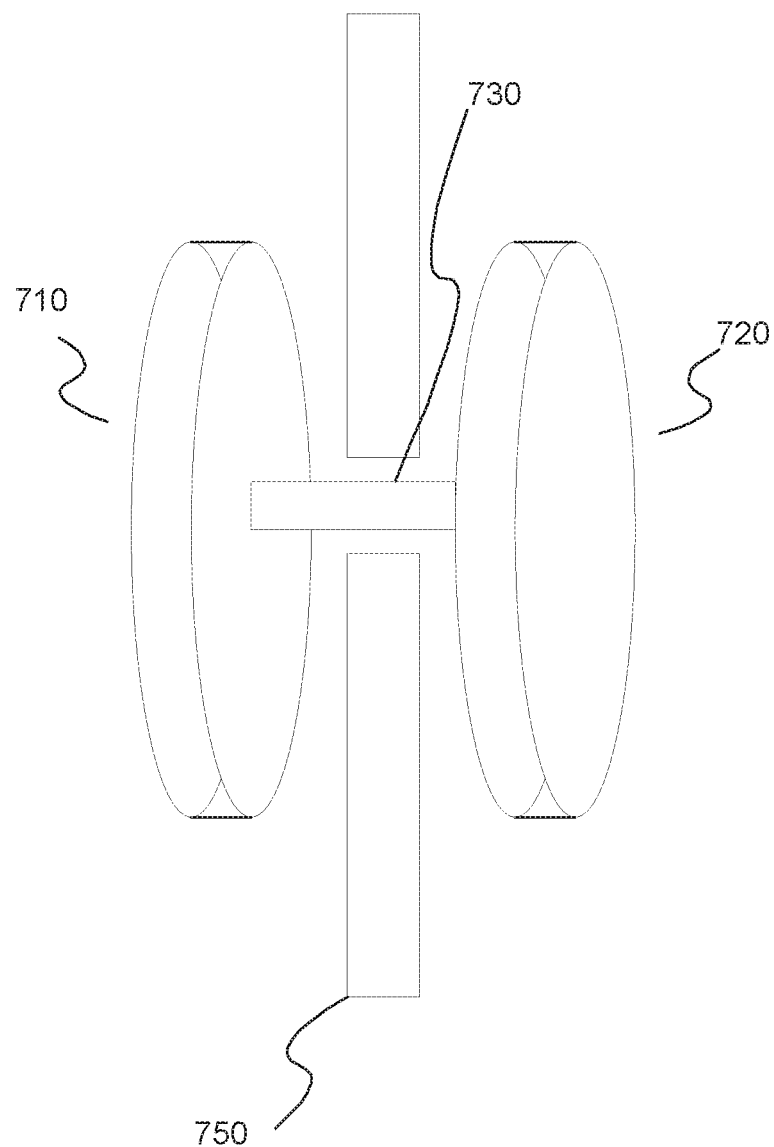
FIG. 11 is a schematic illustration of an embodiment of a wearable apparatus securable to an article of clothing consistent with the present disclosure.

FIG. 11 is a schematic illustration of another embodiment of a wearable apparatus securable to an article of clothing consistent with the present disclosure. As illustrated in FIG. 11, connector 730 may be centrally located with respect to capturing unit 710 and power unit 720. Central location of connector 730 may facilitate affixing apparatus 110 to clothing 750 through a hole in clothing 750 such as, for example, a button-hole in an existing article of clothing 750 or a specialty hole in an article of clothing 750 designed to accommodate wearable apparatus 110.

Figure 12:
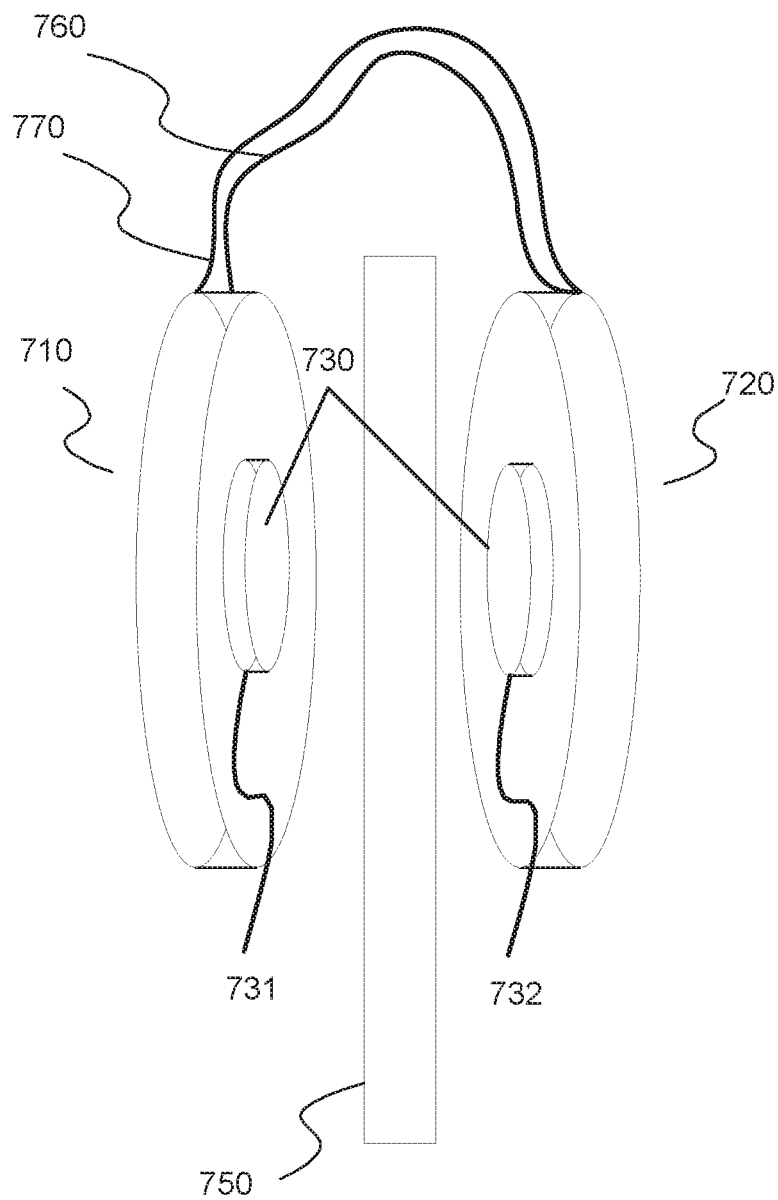
FIG. 12 is a schematic illustration of an embodiment of a wearable apparatus securable to an article of clothing consistent with the present disclosure.

FIG. 12 is a schematic illustration of still another embodiment of wearable apparatus 110 securable to an article of clothing. As illustrated in FIG. 12, connector 730 may include a first magnet 731 and a second magnet 732. First magnet 731 and second magnet 732 may secure capturing unit 710 to power unit 720 with the article of clothing positioned between first magnet 731 and second magnet 732. In embodiments including first magnet 731 and second magnet 732, power cable 760 and data cable 770 may also be included. In these embodiments, power cable 760 and data cable 770 may be of any length, and may provide a flexible power and data connection between capturing unit 710 and power unit 720. Embodiments including first magnet 731 and second magnet 732 may further include a flexible PCB 765 connection in addition to or instead of power cable 760 and/or data cable 770. In some embodiments, first magnet 731 or second magnet 732 may be replaced by an object comprising a metal material.

Figure 13:
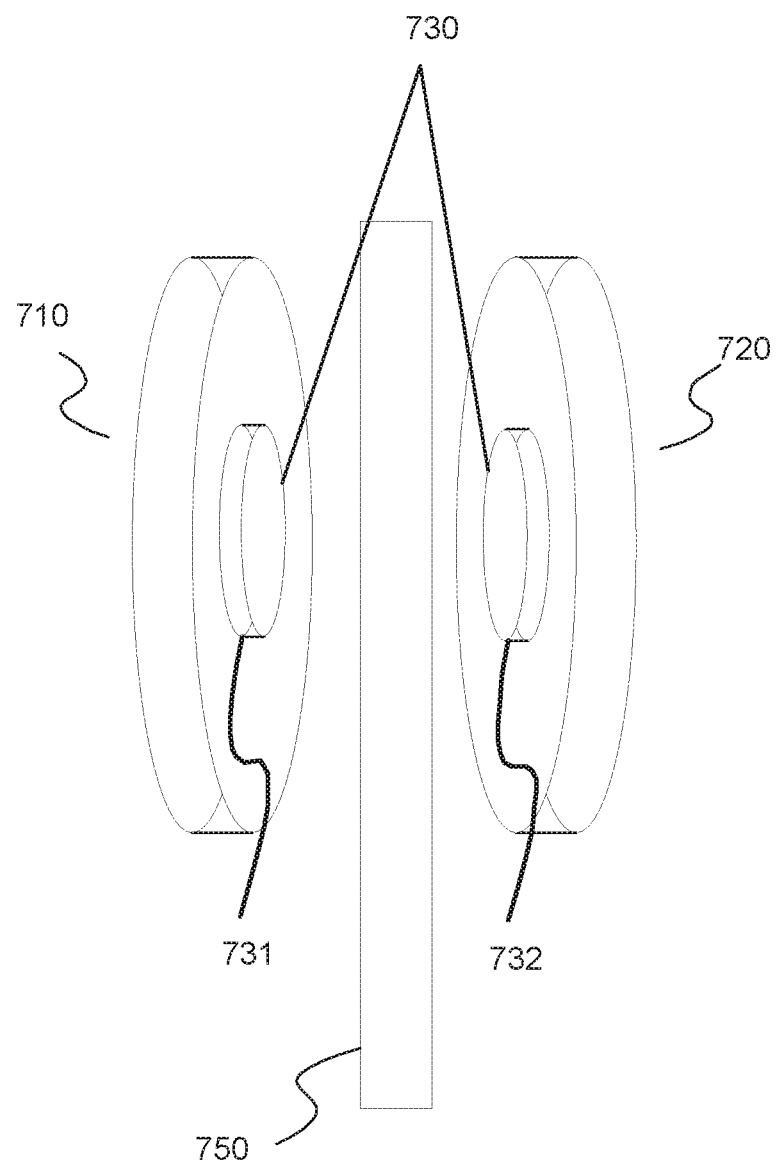
FIG. 13 is a schematic illustration of an embodiment of a wearable apparatus securable to an article of clothing consistent with the present disclosure.

FIG. 13 is a schematic illustration of yet another embodiment of a wearable apparatus 110 securable to an article of clothing. FIG. 13 illustrates an embodiment wherein power and data may be wirelessly transferred between capturing unit 710 and power unit 720. As illustrated in FIG. 13, first magnet 731 and second magnet 732 may be provided as connector 730 to secure capturing unit 710 and power unit 720 to an article of clothing 750. Power and/or data may be transferred between capturing unit 710 and power unit 720 via any suitable wireless technology, for example, magnetic and/or capacitive coupling, near field communication technologies, radiofrequency transfer, and any other wireless technology suitable for transferring data and/or power across short distances.

Figure 14:
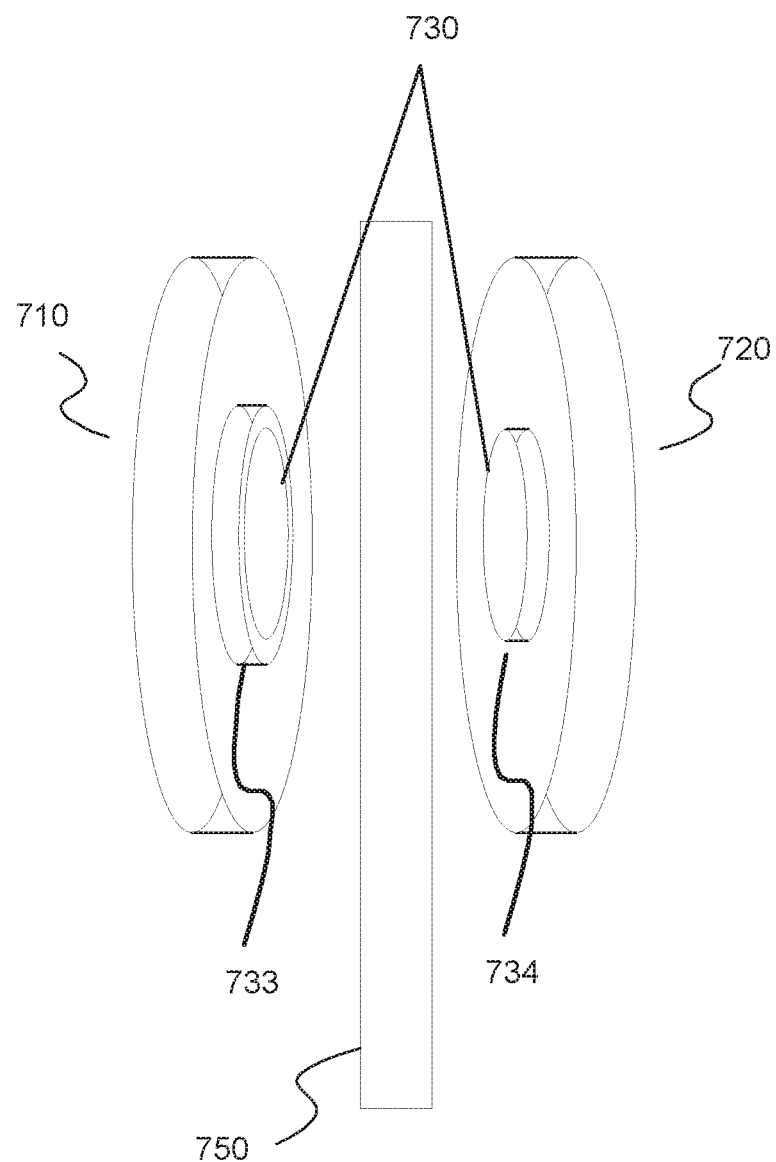
FIG. 14 is a schematic illustration of an embodiment of a wearable apparatus securable to an article of clothing consistent with the present disclosure.

FIG. 14 illustrates still another embodiment of wearable apparatus 110 securable to an article of clothing 750 of a user. As illustrated in FIG. 14, connector 730 may include features designed for a contact fit. For example, capturing unit 710 may include a ring 733 with a hollow center having a diameter slightly larger than a disk-shaped protrusion 734 located on power unit 720. At least one of capturing unit 710 and power unit 720 may further include at least one speaker (not shown), which may further include an associated sound propagation guide (not shown). When pressed together with fabric of an article of clothing 750 between them, disk-shaped protrusion 734 may fit tightly inside ring 733, securing capturing unit 710 to power unit 720. FIG. 14 illustrates an embodiment that does not include any cabling or other physical connection between capturing unit 710 and power unit 720. In this embodiment, capturing unit 710 and power unit 720 may transfer power and data wirelessly. In alternative embodiments, capturing unit 710 and power unit 720 may transfer power and data via at least one of cable 760, data cable 770, and flexible printed circuit board 765.

Figure 15:
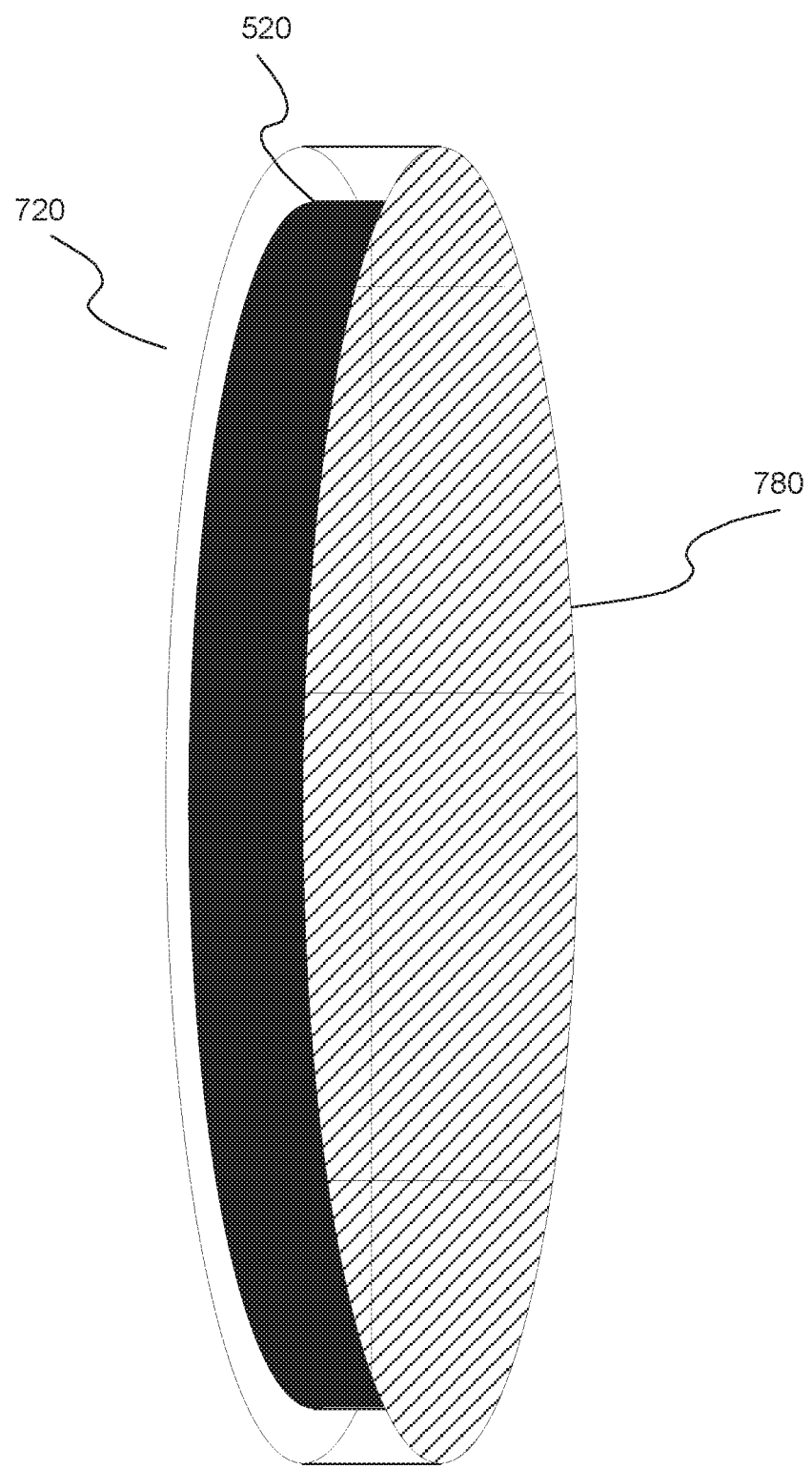
FIG. 15 is a schematic illustration of an embodiment of a wearable apparatus power unit including a power source.

FIG. 15 illustrates another aspect of power unit 720 consistent with embodiments described herein. Power unit 720 may be configured to be positioned directly against the user's skin. To facilitate such positioning, power unit 720 may further include at least one surface coated with a biocompatible material 740. Biocompatible materials 740 may include materials that will not negatively react with the skin of the user when worn against the skin for extended periods of time. Such materials may include, for example, silicone, PTFE, kapton, polyimide, titanium, nitinol, platinum, and others. Also as illustrated in FIG. 15, power unit 720 may be sized such that an inner volume of the power unit is substantially filled by mobile power source 520. That is, in some embodiments, the inner volume of power unit 720 may be such that the volume does not accommodate any additional components except for mobile power source 520. In some embodiments, mobile power source 520 may take advantage of its close proximity to the skin of user's skin. For example, mobile power source 520 may use the Peltier effect to produce power and/or charge the power source.

Figure 16:
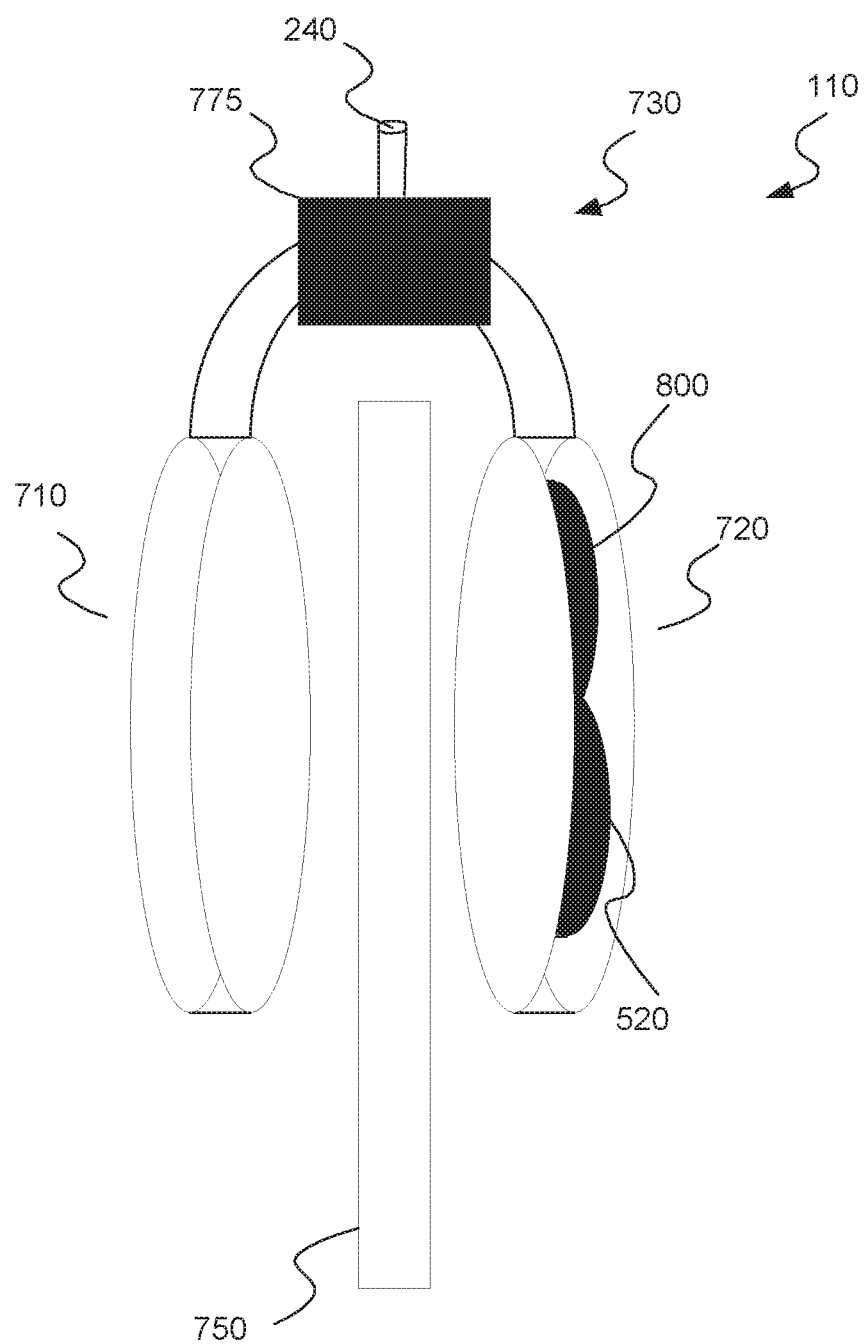
FIG. 16 is a schematic illustration of an exemplary embodiment of a wearable apparatus including protective circuitry.

In further embodiments, an apparatus securable to an article of clothing may further include protective circuitry associated with power source 520 housed in in power unit 720. FIG. 16 illustrates an exemplary embodiment including protective circuitry 775. As illustrated in FIG. 16, protective circuitry 775 may be located remotely with respect to power unit 720. In alternative embodiments, protective circuitry 775 may also be located in capturing unit 710, on flexible printed circuit board 765, or in power unit 720.

Protective circuitry 775 may be configured to protect image sensor 220 and/or one or more speakers (not shown) and/or other elements of capturing unit 710 from potentially dangerous currents and/or voltages produced by mobile power source 520. Protective circuitry 775 may include passive components such as capacitors, resistors, diodes, inductors, etc., to provide protection to elements of capturing unit 710. In some embodiments, protective circuitry 775 may also include active components, such as transistors, to provide protection to elements of capturing unit 710. For example, in some embodiments, protective circuitry 775 may comprise one or more resistors serving as fuses. Each fuse may comprise a wire or strip that melts (thereby braking a connection between circuitry of image capturing unit 710 and circuitry of power unit 720) when current flowing through the fuse exceeds a predetermined limit (e.g., 500 milliamps, 900 milliamps, 1 amp, 1.1 amps, 2 amp, 2.1 amps, 3 amps, etc.) Any or all of the previously described embodiments may incorporate protective circuitry 775.

In some embodiments, protective circuitry 775 may further include one or more speakers (not shown), which may further include associated sound propagation guides, e.g., sound propagation guide 280.

In some embodiments, the wearable apparatus may transmit data to a computing device (e.g., a smartphone, tablet, watch, computer, etc.) over one or more networks via any known wireless standard (e.g., cellular, Wi-Fi, Bluetooth®, etc.), or via near-filed capacitive coupling, other short range wireless techniques, or via a wired connection. Similarly, the wearable apparatus may receive data from the computing device over one or more networks via any known wireless standard (e.g., cellular, Wi-Fi, Bluetooth®, etc.), or via near-filed capacitive coupling, other short range wireless techniques, or via a wired connection. The data transmitted to the wearable apparatus and/or received by the wireless apparatus may include images, portions of images, identifiers related to information appearing in analyzed images or associated with analyzed audio, or any other data representing image and/or audio data. For example, an image may be analyzed and an identifier related to an activity occurring in the image may be transmitted to the computing device (e.g., the "paired device"). In the embodiments described herein, the wearable apparatus may process images and/or audio locally (on board the wearable apparatus) and/or remotely (via a computing device).

Further, in some embodiments, the data transmitted to and/or received by the computing device may include audio output (or feedback). In such embodiments, the computing device may include at least one speaker. Accordingly, if one or more speakers of the computing device is selected, the computing device may then receive the audio output and provide the audio output to the selected speaker(s).

Further, in the embodiments described herein, the wearable apparatus may transmit data related to the analysis of images and/or audio to a computing device for further analysis, display, and/or transmission to another device (e.g., a paired device). Further, a paired device may execute one or more applications (apps) to process, display, and/or analyze data (e.g., identifiers, text, images, audio, etc.) received from the wearable apparatus.

Some of the disclosed embodiments may involve systems, devices, methods, and software products for determining at least one keyword. For example, at least one keyword may be determined based on data collected by apparatus 110. At least one search query may be determined based on the at least one keyword. The at least one search query may be transmitted to a search engine.

In some embodiments, at least one keyword may be determined based on at least one or more images captured by image sensor 220. In some cases, the at least one keyword may be selected from a keywords pool stored in memory. In some cases, optical character recognition (OCR) may be performed on at least one image captured by image sensor 220, and the at least one keyword may be determined based on the OCR result. In some cases, at least one image captured by image sensor 220 may be analyzed to recognize: a person, an object, a location, a scene, and so forth. Further, the at least one keyword may be determined based on the recognized person, object, location, scene, etc. For example, the at least one keyword may comprise: a person's name, an object's name, a place's name, a date, a sport team's name, a movie's name, a book's name, and so forth.

In some embodiments, at least one keyword may be determined based on the user's behavior. The user's behavior may be determined based on an analysis of the one or more images captured by image sensor 220. In some embodiments, at least one keyword may be determined based on activities of a user and/or other person. The one or more images captured by image sensor 220 may be analyzed to identify the activities of the user and/or the other person who appears in one or more images captured by image sensor 220. In some embodiments, at least one keyword may be determined based on at least one or more audio segments captured by apparatus 110. In some embodiments, at least one keyword may be determined based on at least GPS information associated with the user. In some embodiments, at least one keyword may be determined based on at least the current time and/or date.

In some embodiments, at least one search query may be determined based on at least one keyword. In some cases, the at least one search query may comprise the at least one keyword. In some cases, the at least one search query may comprise the at least one keyword and additional keywords provided by the user. In some cases, the at least one search query may comprise the at least one keyword and one or more images, such as images captured by image sensor 220. In some cases, the at least one search query may comprise the at least one keyword and one or more audio segments, such as audio segments captured by apparatus 110.

In some embodiments, the at least one search query may be transmitted to a search engine. In some embodiments, search results provided by the search engine in response to the at least one search query may be provided to the user. In some embodiments, the at least one search query may be used to access a database.

For example, in one embodiment, the keywords may include a name of a type of food, such as quinoa, or a brand name of a food product; and the search will output information related to desirable quantities of consumption, facts about the nutritional profile, and so forth. In another example, in one embodiment, the keywords may include a name of a restaurant, and the search will output information related to the restaurant, such as a menu, opening hours, reviews, and so forth. The name of the restaurant may be obtained using OCR on an image of signage, using GPS information, and so forth. In another example, in one embodiment, the keywords may include a name of a person, and the search will provide information from a social network profile of the person. The name of the person may be obtained using OCR on an image of a name tag attached to the person's shirt, using face recognition algorithms, and so forth. In another example, in one embodiment, the keywords may include a name of a book, and the search will output information related to the book, such as reviews, sales statistics, information regarding the author of the book, and so forth. In another example, in one embodiment, the keywords may include a name of a movie, and the search will output information related to the movie, such as reviews, box office statistics, information regarding the cast of the movie, show times, and so forth. In another example, in one embodiment, the keywords may include a name of a sport team, and the search will output information related to the sport team, such as statistics, latest results, future schedule, information regarding the players of the sport team, and so forth. For example, the name of the sport team may be obtained using audio recognition algorithms.

Systems and methods of the present disclosure may direct audio output of wearable apparatus 110 based on at least one indicator of head orientation of a user. This may ensure that the audio output is directed to a speaker such that the user may hear the audio. This may further ensure that the output is directed to a speaker such that a minimal amount of audio is transmitted to the environment, which may include other people. For example, consistent with one or more disclosed embodiments, at least one image captured by image sensor 220 may be analyzed to recognize at least one orientation indicator. Further, the image may be analyzed for one or more known indicators, as discussed above. By way of further example, the image may be analyzed to identify at least one body part, which is then may be assessed for one or more orientation indicators.

Figure 17:
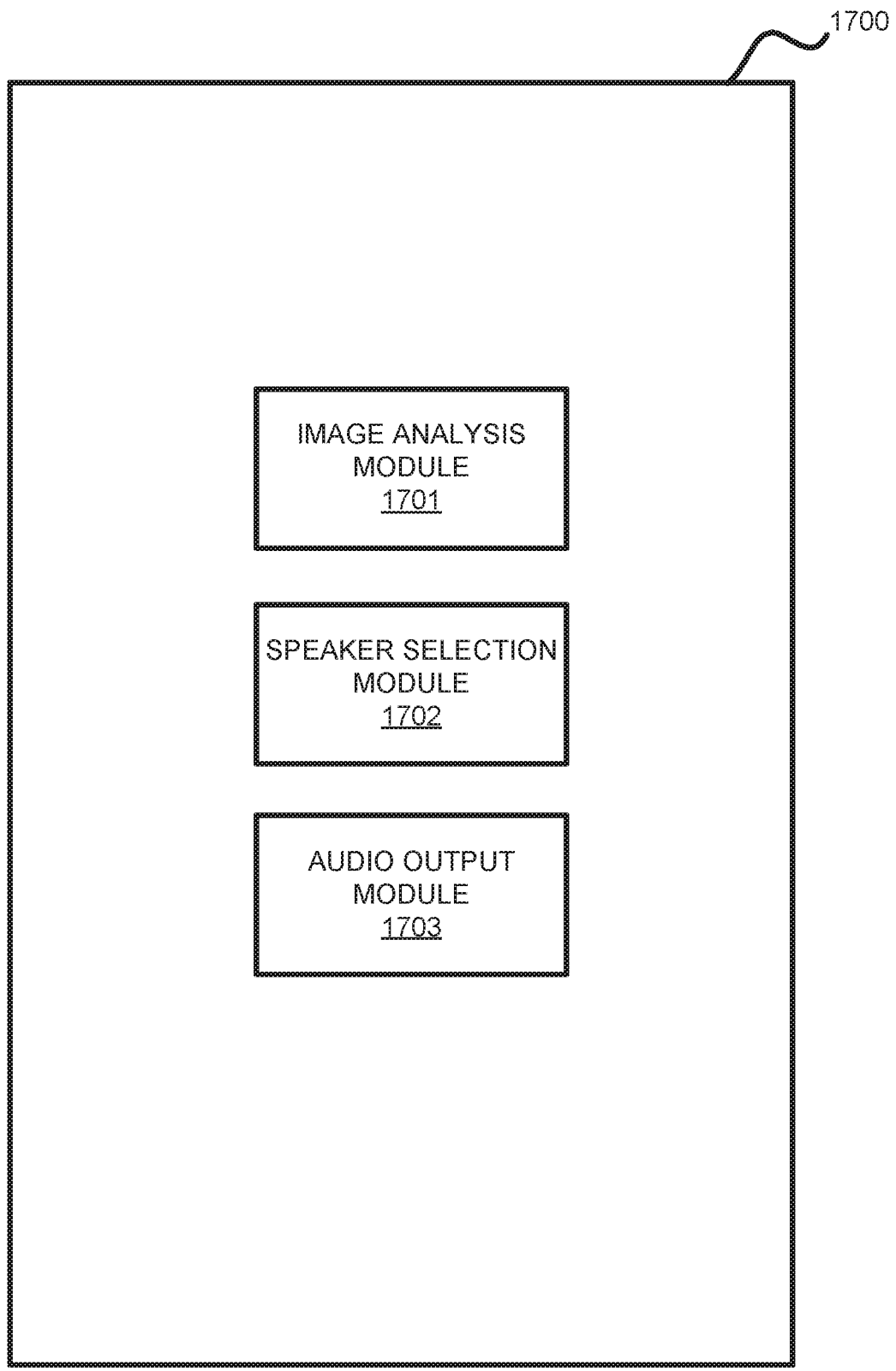
FIG. 17 illustrates another exemplary embodiment of a memory containing software modules consistent with the present disclosure.

FIG. 17 illustrates an exemplary embodiment of a memory containing software modules consistent with the present disclosure. Included in memory 1700 are an image analysis module 1701, a speaker selection module 1702, and an audio output module 1703. Modules 1701, 1702, and 1703 may contain software instructions for execution by at least one processing device, e.g., processor 210, included with a wearable apparatus. Image analysis module 1701, speaker selection module 1702, and audio output module 1703 may cooperate to select one or more speakers incorporated into wireless apparatus 110 for audio output. Memory 1700 may be separate from and/or integrated with memory 550 of FIG. 6, described above. Similarly, orientation identification module 601, orientation adjustment module 602, and motion tracking module 603 of FIG. 6 may operate in tandem or concurrently with image analysis module 1701, speaker selection module 1702, and audio output module 1703 of FIG. 17.

Image analysis module 1701 may be configured to identify at least one orientation indicator from one or more images. An orientation indicator may be identified, for example, by analyzing one or more images for a known indicator. For example, with respect to the head, a known indicator may include the position of an ear, the position of the tip of the chin, the position of one or more nostrils, or the like. For example, a known indicator may include the position and/or orientation of one body part in relation to another body part, such as the position of the ear with respect to the torso, the orientation of the chin with respect to the torso, and so forth. Image analysis module 1701 may also have a machine analysis algorithm incorporated such that a library of known indicators may be updated each time image analysis module 1701 may be used.

Speaker selection module 1702 may be configured to select one or more speakers of apparatus 110. As discussed above, apparatus 110 may include a plurality of speakers. In some embodiments, the speakers may further include associated sound propagation guides.

Audio output module 1703 may provide audio output (or feedback) to the selected speaker(s). For example, audio output module 1703 may send the same audio stream to the selected speakers (resulting in "mono" sound) or may send separate audio channels to separate speakers in the group of selected speakers (for example, resulting in "stereo" sound). For example, the selected speakers may be used to produce a beeping sound, to play a sound recording, to provide audio feedback to the user actions, to play one or more audio streams, and so forth.

Figure 18:
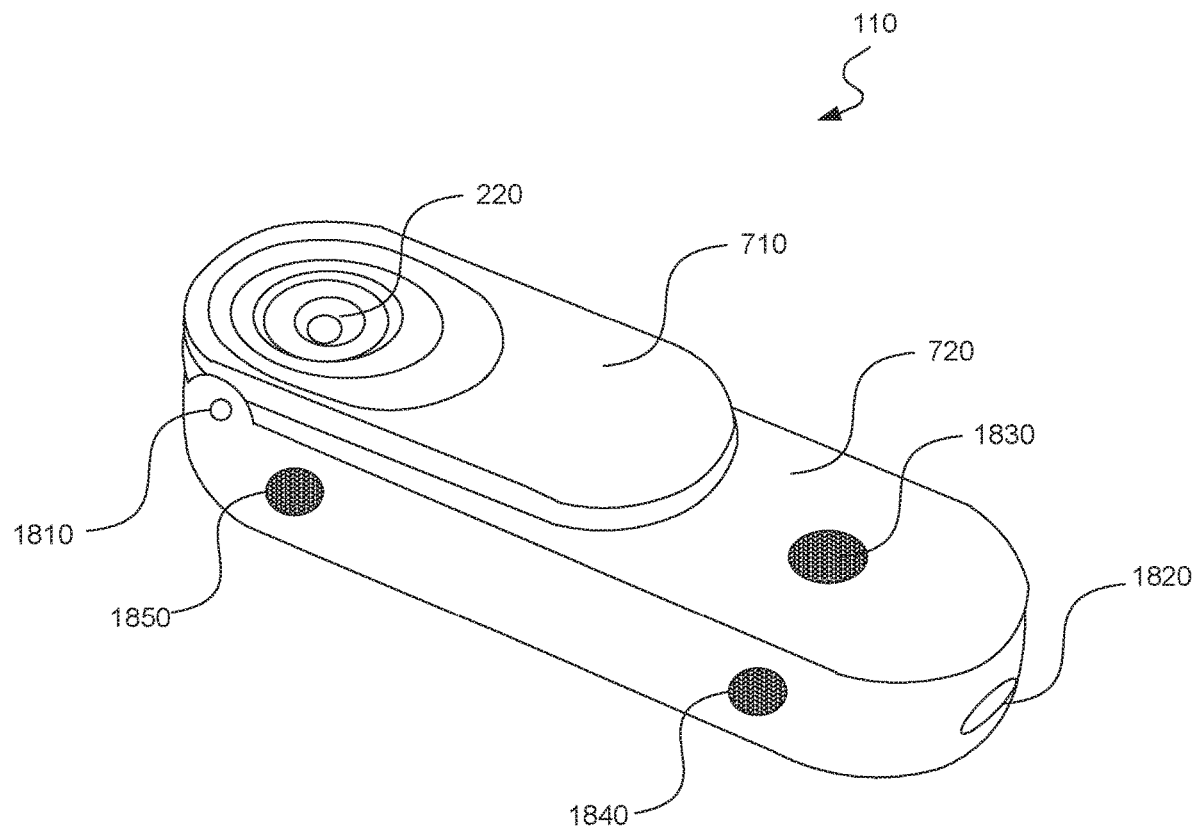
FIG. 18 is a schematic illustration of another example system consistent with the disclosed embodiments.

FIG. 18 illustrates still another embodiment of wearable apparatus 110 securable to an article of clothing of a user. As illustrated in FIG. 18, capturing unit 710 may include image sensor 220 and may connect to power unit 720 by one or more hinges, e.g., hinge 1810, such that capturing unit 710 may be positioned on one side of an article of clothing and power unit 720 may be positioned on the opposite side of the clothing. Power unit 720 may include a plug 1820 configured to receive a cable for transferring data and/or power to apparatus 110. Accordingly, in some embodiments, apparatus 110 may contain all its components inside a housing unit.

As further illustrated in FIG. 18, apparatus 110 may include a plurality of speakers, e.g., speakers 1830, 1840, and 1850. The term "speaker" includes any device that converts electrical audio signal into sound, such as dynamic speakers, moving iron speakers, piezoelectric speakers, magnetostatic speakers, magnetostrictive speakers, electrostatic speakers, ribbon speakers, planar magnetic speakers, bending wave speakers, flat panel speakers, air motion transformer speakers, transparent ionic conduction speakers, plasma speakers, thermoacoustic speakers, rotary woofer, digital speakers, parabolic speakers, directional speakers, omnidirectional speakers, non-directional speakers, and so forth.

One or more speakers may further include a sound propagation guide (not shown), as described above. A processor (not shown) within apparatus 110 may be configured to select one or more speakers in the plurality of speakers for audio output (or feedback), for example, by using method 2200 described below.

In some embodiments, each of the plurality of speakers may be associated with a direction, a range of directions, and so forth. For example, two or more speakers may be oriented in different directions, in a fixed or adjustable manner, to cover different ranges of directions and/or overlapping ranges of directions. Some or all of the plurality of speakers may be selectively activated, e.g., by at least one processor, to output audio. The at least one processor may include at least one of processors 210, 210*a*, 210*b*, and 540. The at least one processor may select one or more speakers of the plurality of speakers and direct output audio to the selected speaker(s). The selected one or more speakers may have a combined range of directions that includes a targeted object, a targeted group of objects, a targeted direction, a targeted group of directions, a targeted range of directions, a targeted environment, and so forth. Moreover, the processing device may use different speakers to output different audio signals, for example, in order to create stereo audio output, as described above, or in order to partially cancel the audio output in one or more directions, as described below.

In some embodiments, the selection of the one or more speakers may be based on the estimation of the direction of the head or parts of the head of user 100. For example, each of the plurality of speakers may be associated with a direction, and the at least one processor may select the speaker(s) with the closest associated direction to the estimated direction the head or parts of the head of user 100. By way of further example, each direction may be associated with one or more speakers, and the at least one processor may select the speaker(s) that associate to the estimated direction of the head or parts of the head of user 100. By way of further example, each of the plurality of speakers may be associated with a range of directions, and the at least one processor may select the speaker(s) associated with a range of directions that includes the estimated direction of the head or parts of the head of user 100.

In some embodiments, the volume of the audio output may be controlled based on the estimated distance between the selected speaker(s) and at least one of the head of user 100, a part of the head of user 100, and so forth. The volume of each selected speaker may be controlled in tandem with other selected speakers or independently. For example, if the at least one processor selects two speakers of the plurality of speakers, the at least one processor may further adjust the volume such that the speaker of the selected two speakers that is closer to an ear of user 100 is louder than the other speaker of the selected two speakers.

In some embodiments, the selected speakers may be used in combination such that a minimal amount of audio is transmitted to the environment. For example, if the at least one processor selects two speakers of the plurality of speakers, the at least one processor may send a first audio signal containing the audio output to one speaker of the selected two speakers and send a second audio signal configured to cancel at least a portion of the first audio signal to the other speaker of the selected two speakers. The at least one processor may determine which speaker(s) receive the one or more signals containing the audio output and which speaker(s) receive the one or more cancelling signals based, for example, on an estimated distance between the speaker and at least one of the head of user 100, a part of the head of user 100, and so forth. By way of further example, the at least one processor may determine which speaker(s) receive the one or more signals containing the audio output and which speaker(s) receive the one or more cancelling signals based on which speaker(s) have an associated direction closer to the estimated direction of the head or parts of the head of user 100.

In yet other embodiments, in some situations, an external speaker may be positioned in a suitable location for outputting audio to user 100. Accordingly, in some embodiments, at least one selected speaker may be included in a device external to wearable apparatus 110. For example, wearable apparatus 110 may cause audio to be output using wireless communication (e.g., Bluetooth, WiFi, etc.) to an external speaker.

Figure 19:
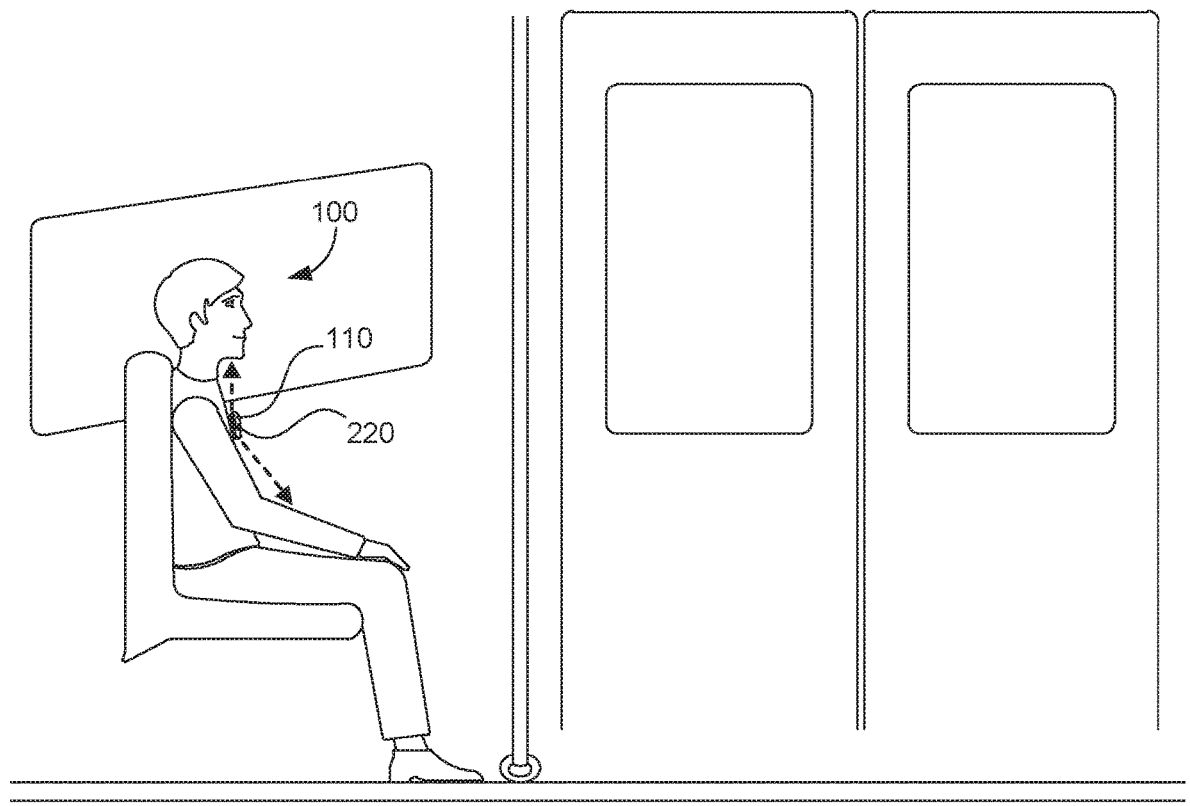
FIG. 19 is a schematic illustration of a user wearing the wearable apparatus shown in FIG. 18.

FIG. 19 illustrates still another example of user 100 wearing apparatus 110 of FIG. 18. As illustrate in FIG. 19, the aiming direction of apparatus 110, according to this embodiment, may include one or more body parts of user 100. For example, in FIG. 19, apparatus 110 may be aimed to view, at least in part, a portion of the head of user 100. Image sensor 220 may comprise a wide-angle camera or other wide angle image sensor to facilitate the wide point-of-view of apparatus 110 depicted in FIG. 19. Apparatus 110 may also include an accelerometer, a gyroscope, or other sensor for determining movement or orientation of a body part of user 100 for identifying orientation.

Figure 20:
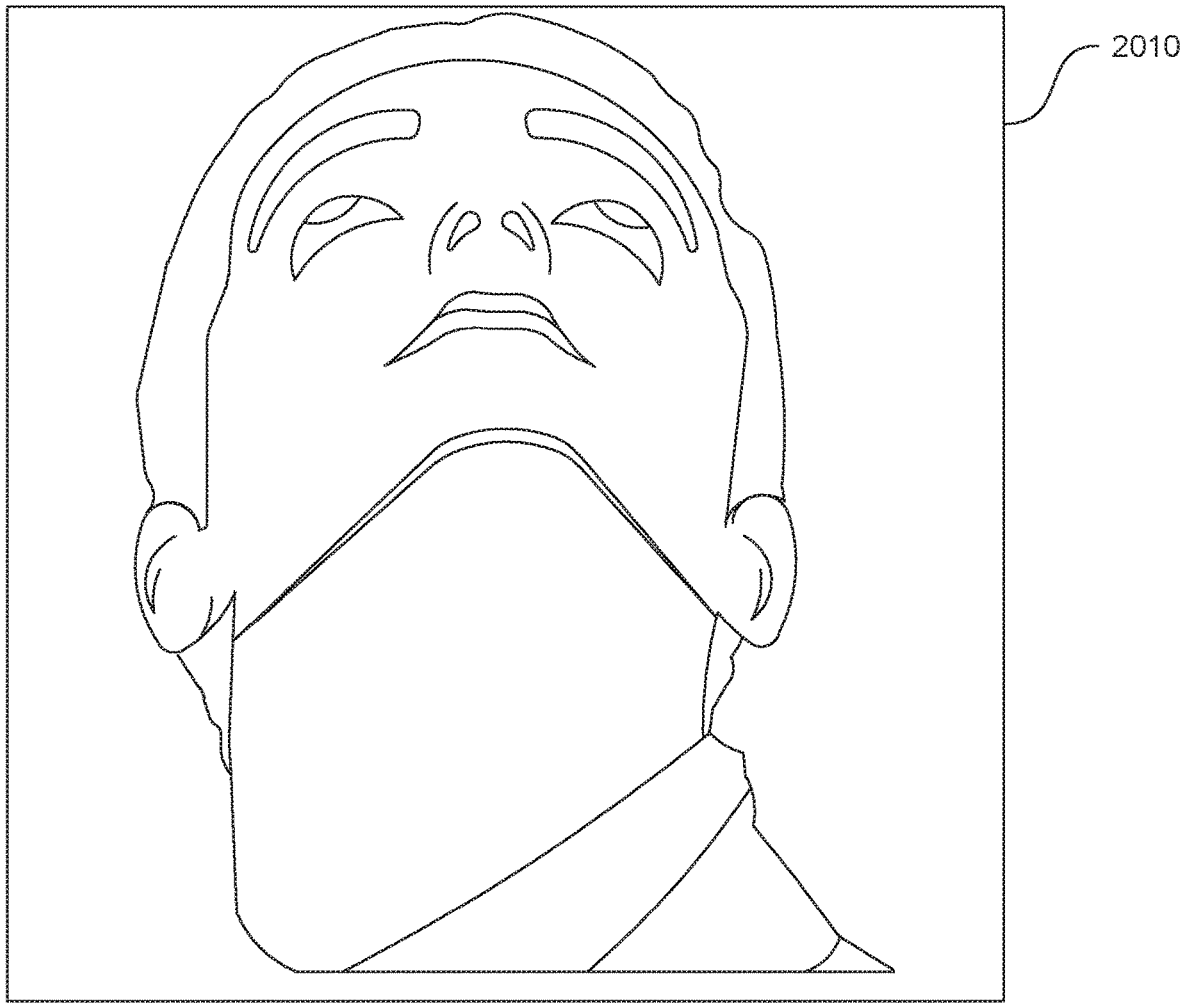
FIG. 20 is a schematic illustration of a point-of-view of the wearable apparatus of FIG. 19 consistent with the present disclosure.

FIG. 20 is a schematic illustration of a point-of-view 2010 of wearable apparatus 110 depicted in FIG. 19. As illustrated in FIG. 20, point-of-view 2010 includes the head of user 100 as viewed from below the chin. From point-of-view 2010, image sensor 220 may capture one or more images, which a processor of apparatus 110 may then analyze for one or more orientation indicators of the head of user 100. For example, the processor may identify the position of one or two ears, the position of the tip or other portion of the chin, the position of one or more nostrils, or the like as an orientation indicator of the head of user 100.

In some embodiments, wearable apparatus 110 may use one or more image analysis techniques, such as image enhancement, edge detection, or data extraction. For example, wearable apparatus 110 may apply the image analysis techniques to detect one or more features and/or body parts (e.g., a head, an ear, an eye, a nose, a chin, etc.) in one or more images. Further, wearable apparatus 110 may compare features or sizes of features and/or body parts in an image. These comparisons may include determining certain relationships between positions of body parts and/or features in an image (e.g., a position or a distance to a portion of a nose, an eye, or an ear relative to a position or a distance to a portion of a chin or neck or shoulder area, etc.).

In some embodiments, apparatus 110 may include one or more accelerometers. In such embodiments, at least one processor, e.g., at least one of processors 210, 210a, 210b, and 540, may use data from the one or more accelerometers to find the upward direction. For example, the at least one processor may use the data to estimate the direction of earth's gravity, e.g., by averaging the proper acceleration readings of the one or more accelerometers, and to estimate the upward direction as the opposite direction to earth's gravity. Alternatively or concurrently, the at least processor may use the image data captured by image sensor 220 to find the upward direction. For example, the at least one processor may detect the horizon within the image data, followed by an estimation of the upward position, e.g., by estimating the angle of the device with respect to the horizon, by calculating the horizon plain and estimating the upward direction as perpendicular to the horizon plain, by estimating the upward direction directly from the region of the image containing the horizon, and so forth, including any combination of these techniques.

Figure 21:
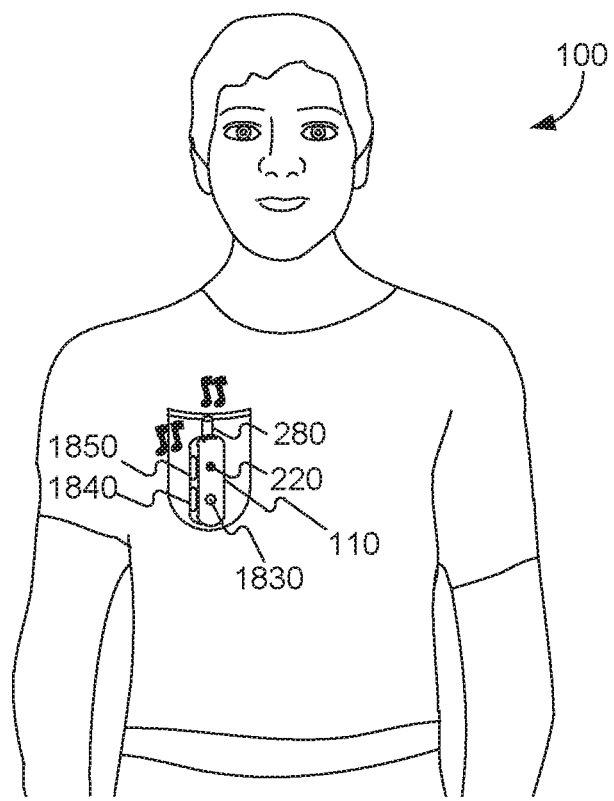
FIG. 21 is another schematic illustration of a user wearing the wearable apparatus shown in FIG. 18.

FIG. 21 illustrates still another example of user 100 wearing apparatus 110 of FIG. 18. As illustrated in FIG. 21, apparatus 110 may be worn on a shirt pocket of user 100. As further illustrated in FIG. 21, at least one processor, e.g., at least one of processors 210, 210a, 210b, has selected speaker 1850 and the speaker associated with sound propagation guide 280 for audio output. Accordingly, speaker 1850 and the speaker associated with sound propagation guide 280 produce sound while speakers 1840 and 1830 do not.

As further illustrated in FIG. 21, sound propagation guide 280 comprises a cylindrical tube. Moreover, sound propagation guide 280 may be configured to direct the audio toward an ear of the user. In the example depicted in FIG. 21, sound propagation guide 280 may be configured to direct the audio toward the left ear of user 100. One skilled in the art would recognize that other configurations of sound propagation guide 280 are possible, including configurations that direct the audio toward the right ear of user 100.

Figure 22:
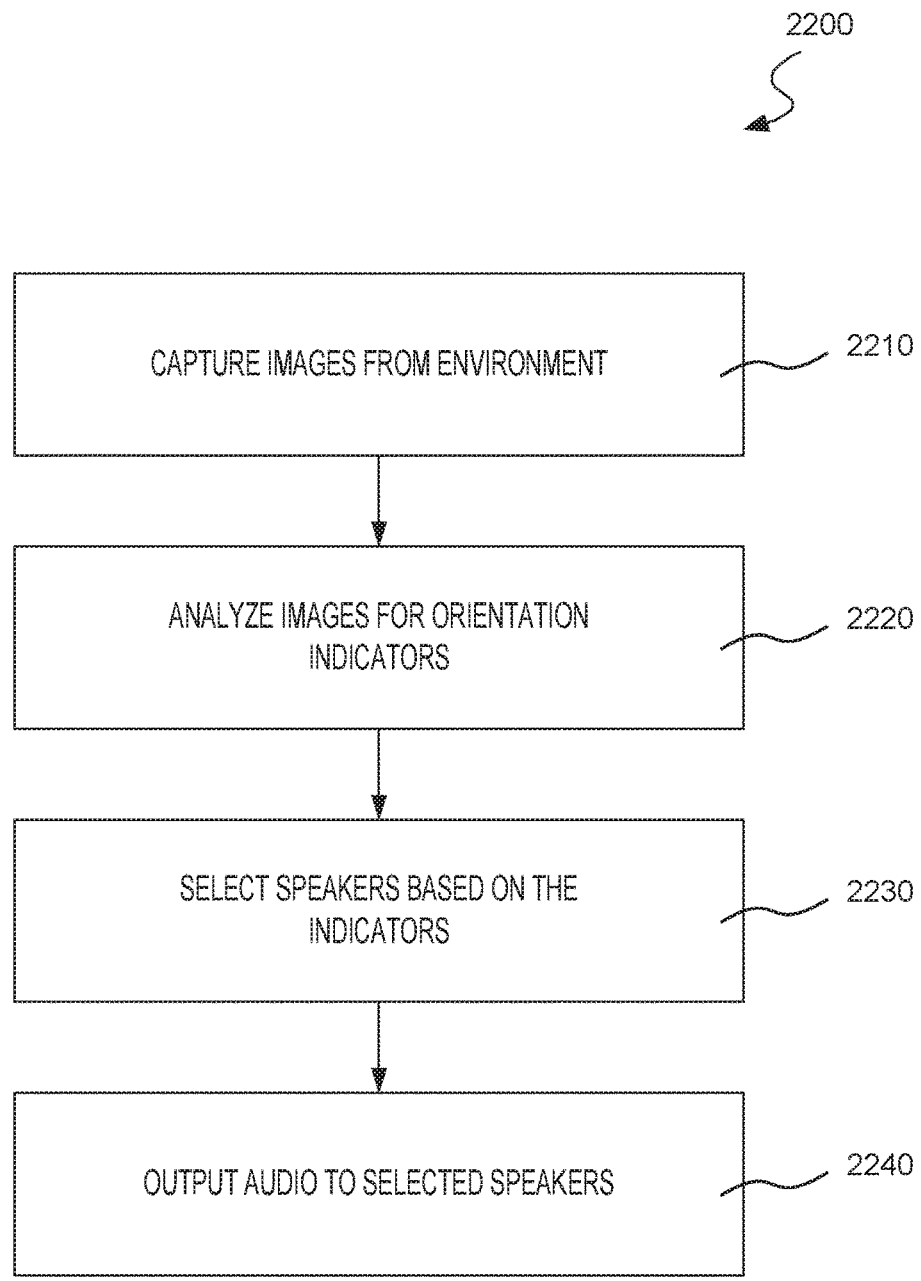
FIG. 22 is a flowchart of a method for providing audio to a user of the wearable apparatus according to a disclosed embodiment.

FIG. 22 is a flowchart of method 2200 for providing audio to a user of the wearable apparatus. Method 2200 may be implemented by a general-purpose computer or a special-purpose computer built according to embodiments of the present disclosure. For example, method 2200 may be executed by at least one of processors 210, 210a, 210b, and 540.

At step 2210, a camera included in wearable apparatus 110 may capture one or more images from an environment. The environment may include anything within visual perception of a user of wearable apparatus 110. For example, at least one image sensor, e.g., image sensor 220, may capture the one or more images.

At step 2220, wearable apparatus 110 may analyze the one or more images to determine at least one indicator of orientation. For example, wearable apparatus 110 may determine at least one indicator of orientation for a body part, e.g., the head, of the user, as described above. The at least one indicator may be used to estimate direction of the body part and/or distance from the body part and/or a part of the body part to wearable apparatus 110 and/or a part of wearable apparatus 110.

In some embodiments, the body and/or parts of the body of one or more persons other than the user may be visible in the captured image data. In such embodiments, the processor may disregard image data related to the body and/or parts of the body of the one or more persons other than the user. Alternatively, the processor may disregard indicators of orientation related to the body and/or parts of the body of the one or more persons other than the user. Accordingly, in some embodiments, additional processing to identify whether the body part is associated with the user may be performed.

In some examples, the determination whether a detected body part region is associated with the user may be based, at least in part, on whether the detected body part region occupies a threshold amount of space in at least one image of the analyzed image data. The threshold amount of space may, for example, be predefined or learned and programmed based on a number of test images of the associated body part of the user. For example, the predefined threshold of space that a user's body part occupies in an image to be associated with the user may be defined as at least ten percent or twenty percent (or more) of the image. Other thresholds may be used and may be based on various known characteristics of the user, such as size or age. By way of further example, a threshold amount of space may be based on the specific type of body part, e.g., a higher percentage may be used for the head than for a hand.

In some examples, a size of the detected body part may also be determined to identify whether the body part is associated with the user. For example, a size of the body part may be based on the relative size of the detected body part portion in comparison to an anticipated size. By way of further example, a size of the detected body part portion may be based on the relative size of the detected body part in comparison with a known size of one or more other detected objects identified in the field of view, such as a car, a sign, a product, a tree, a landmark, the figure of a person, or the like. In such an example, the comparison may be based on known information regarding the identified objects stored in a database. By way of further example, the determination may be based on a distance of the detected body part from the user. For example, an approximate distance of the detected body part from the processor may be identified based on the comparison with known sizes of other objects. One skilled in the art would understand that there are other ways of determining a distance of a body part region away from a user consistent with the present disclosure.

In some examples, the processor may also use other image processing techniques based on known parameters of the image sensor to determine the size and distance of the detected body part from the processor. For example, in embodiments in which wearable apparatus 110 includes a first image sensor (e.g., first image sensor 220*a*) and a second image sensor (e.g., second image sensor 220*b*), the image data from the two image sensors may be analyzed using known techniques to determine the distance of the detected body part from the processor, e.g., using binocular disparity. Other known techniques based on, for example, an infrared proximity sensor or other optical distance sensors and/or an ultrasonic distance sensor, may also be used to determine the distance of a detected object from the sensor. For example, any known sensor technology for determining distance based on a reflected or received signal is consistent with the disclosed embodiments.

In some examples, the processor may determine that a detected body part is associated with the user when the detected body part corresponds to or exceeds a threshold percentage (e.g., ten percent, twenty percent, thirty percent, forty percent, fifty percent, or more, etc.) of the entire field of view, when a size of the body part portion exceeds a size threshold, when a determined distance is less than a threshold, or any combination thereof. These techniques may also be implemented sequentially, with each other and/or with other analysis techniques (e.g., the techniques described above). For example, the processor may determine that the identified body part portion does not meet a required threshold percentage to be associated with the user and then perform no further analysis. In this example, on the other hand, if the identified body part portion meets or exceeds a threshold for being associated with the user, the processor may perform additional image analysis to confirm whether the identified body part portions are associated with the user.

In some examples, the processor may classify at least one of the body parts as being associated with the user. For example, the processor may further include determining whether the detected body portion matches that of stored images of a user's body. The determination may be based on identifying various features of a user's body part as may be determined based on a comparison with stored images of the user's body part and/or information associated with images of the user's body part. The stored images of the user's body part may include a plurality of images of the user's body part from various angles or in different positions. Examples of identifying features include the general appearance of the user's body part, as well as the presence of a birthmark in a particular location, a ring on a particular finger, a tattoo, a bracelet, a wristwatch, or other object typically associated with the user or characteristic identifying the user. Additional image analysis may be performed to identify a context or orientation of the detected body part portion and to determine whether such a context or orientation may be consistent with the user. For example, the processor may determine that the body part portion visible is not positioned at an orientation that would be natural for the user. Accordingly, based on the image analysis, the processor may determine that the body part portion visible is not associated with the user.

The above techniques for determining whether a user's body part is identified in the analyzed image data are exemplary only. Other similar techniques for identifying a user's body part are contemplated by the present disclosure. In some embodiments, one or more of the above techniques may be combined to determine whether an identified body part portion is associated with the user. In certain aspects, the determination may use a weighting or confidence score. For example, any one or more image analysis techniques as described above (or similar to those described) may be performed to determine whether a body part portion is associated with the user. The result of an analysis may then be associated with a weight or confidence score corresponding to the likelihood that the outcome of the analysis may be determinative. In certain aspects, a total confidence score and/or a total weight score may then be based on the results of one or more determinations. If a confidence score threshold and/or a weight score threshold is met or exceeded, the processor may determine that the identified body part portion belongs to a person other than the user.

In some embodiments, wearable apparatus 110 may further include at least one accelerometer. In such embodiments, step 2220 may further include estimating the direction of the body part, e.g., the head, of the user using the output from the at least one accelerometer, as described above.

In some embodiments, step 2220 may further include analyzing the one or more images to select at least one region of at least one of the images. For example, wearable apparatus 110 may select the at least one region based on detecting the body part, e.g., the head, of the user in the one or more images. Wearable apparatus 110 may thus identify the at least one indicator of head orientation within the selected region rather than the image as a whole. By way of further example, wearable apparatus 110 may select the at least one region based on detecting a horizon in the one or more images. Accordingly, in some embodiments, wearable apparatus 110 may thus use image data to determine the upward direction, either individually or in combination with output from at least one accelerometer.

At step 2230, wearable apparatus 110 may select at least one of a plurality of speakers included in the system based on the at least one indicator of orientation. For example, as described above, wearable apparatus 110 may select one or more speakers associated with a direction or range of directions that is equal to or sufficiently close to the estimated direction of the body part, e.g., the head, of the user. In some embodiments, step 2230 may further include adjusting the volume of the one or more selected speakers based on the estimated distance between the system and/or a part thereof (e.g., one or more speakers of the system) and the body part (e.g., the head) of the user and/or a part thereof (e.g., an ear).

In some embodiments, step 2230 may further including generating one or more secondary sound signals configured to cancel at least a portion of the audio output. For example, the system may generate the secondary sound signals for transmission to a subset of the selected speakers or to speakers not selected.

At step 2240, wearable apparatus 110 may output the audio to the user of the wearable apparatus via the selected at least one of the plurality of speakers. For example, wearable apparatus 110 may send one or more audio signals to the selected speaker(s), which may then transform the electronic signal to an acoustic signal.

In some embodiments, wearable apparatus 110 may direct the audio output to a subset of the selected speakers and direct the secondary sound signals to the remaining selected speakers. Alternatively, wearable apparatus 110 may direct the audio output to the selected speaker(s) and direct the second sound signals to at least one non-selected speaker. Accordingly, wearable apparatus 110 may direct the audio output to the user while minimizing the amount of audio that is transmitted to the environment.

Method 2200 may be repeated based one or more triggers. For example, after step 2240, new estimations of the direction of the head or parts of the head of the user may be obtained. For example, wearable apparatus 110 may analyze one or more subsequent images to determine at least one new indicator of orientation. Accordingly, wearable apparatus 110 may repeat steps 2210 and/or 2220 after step 2240.

This can be performed in response to a trigger, in response to an event, periodically, continuously, and so forth. For example, a trigger may be provided by the user. By way of further example, a trigger may include an electronic indication of the attachment and/or reattachment of the system. Such electronic indication may be provided by a sensor configured to monitor the state and/or changes in the state of a clip included in the system.

Based on the at least one new indicator of orientation, a new direction of the body part and/or a new distance from the body part and/or a part of the body part to the system and/or a part of the system may be estimated. Wearable apparatus 110 may use this information to select a new group of one or more speakers of the plurality of speakers. Accordingly, wearable apparatus 110 may repeat step 2230 after repeating steps 2210 and/or 2220.

Based on the selection, the at least one processing device may start using the newly selected one or more speakers. Accordingly, wearable apparatus 110 may repeat step 2240 after repeating step 2230. In some embodiments, wearable apparatus 110 may use the newly selected speaker(s) for additional audio and/or in combination with the previously selected one or more speakers. Alternatively, wearable apparatus 110 may use the newly selected one or more speakers and cease using the previously selected one or more speakers. In this way, wearable apparatus 110 may perform iterative updating of the selected speaker(s) to ensure that the selection responds to movements by the user.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A wearable apparatus for providing audio to a user of the wearable apparatus, the wearable apparatus comprising:
    an image sensor configured to capture one or more images from an environment of the user of the wearable apparatus;
    a plurality of speakers; and
    at least one processor configured to:
        analyze the one or more images to determine at least one indicator of head orientation of the user of the wearable apparatus based on a position of a chin of the user;
        estimate at least one distance between at least a portion of the head of the user and at least one of the plurality of speakers;
        select at least one of the plurality of speakers based on the at least one indicator of head orientation and the at least one estimated distance; and
        output the audio to the user of the wearable apparatus via the selected at least one of the plurality of speakers.

2. The wearable apparatus of claim 1, wherein the chin of the user is visible from a perspective of the wearable apparatus in at least one of the images and the at least one indicator of head orientation is based on a relative position of the chin of the user relative to another part of the user's body.

3. The wearable apparatus of claim 1, wherein the plurality of speakers are oriented in different directions, and the different directions are associated with targeted objects.

4. The wearable apparatus of claim 1, wherein the at least one processor is configured to update a library of known indicators based on the determined indicator.

5. The wearable apparatus of claim 1, wherein the selected at least one speaker has a closest associated direction to the head of the user.

6. The wearable apparatus of claim 1, wherein the selected at least one speaker is associated with a range of directions that includes an estimated direction of the head of the user.

7. The wearable apparatus of claim 1, further comprising at least one accelerometer, and wherein the at least one processor is further configured to receive an output from the at least one accelerometer.

8. The wearable apparatus of claim 7, wherein an estimated direction of the head of the user is based on the output from the at least one accelerometer.

9. The wearable apparatus of claim 7, wherein the at least one processor is further configured to determine an estimated direction of a gravitational force based on the output from the at least one accelerometer, and the at least one indicator of head orientation is based on the estimated direction of the gravitational force.

10. The wearable apparatus of claim 1, further comprising a sound propagation guide associated with the selected speaker, and wherein the sound propagation guide is configured to direct the audio toward an ear of the user.

11. A method for providing audio to a user of a wearable apparatus, the method comprising:
    capturing, via an image sensor included in the wearable apparatus, one or more images from an environment of the user of the wearable apparatus;
    analyzing, via at least one processor included in the wearable apparatus, the one or more images to determine at least one indicator of head orientation of the user of the wearable apparatus based on a position of a chin of the user;
    estimating, via the at least one processor, at least one distance between at least a portion of the head of the user and at least one of the plurality of speakers;
    selecting, via the at least one processor, at least one of a plurality of speakers included in the wearable apparatus based on the at least one indicator of head orientation and the at least one estimated distance; and
    outputting the audio to the user of the wearable apparatus via the selected at least one of the plurality of speakers.

12. The method of claim 11, wherein the chin of the user is visible from a perspective of the wearable apparatus in at least one of the images and the at least one indicator of head orientation is based on a relative position of the chin of the user relative to another part of the user's body.

13. The method of claim 11, wherein the plurality of speakers are oriented in different directions, and the different directions are associated with targeted objects.

14. The method of claim 11, wherein the at least one processor is configured to update a library of known indicators based on the determined indicator.

15. The method of claim 11, wherein the selected at least one speaker has a closest associated direction to the head of the user.

16. The method of claim 11, wherein the selected at least one speaker is associated with a range of directions that includes an estimated direction of the head of the user.

17. The method of claim 11, further comprising analyzing, via the at least one processor, the one or more images to select at least one region of at least one of the images, and wherein the at least one indicator of head orientation is based on analysis of the selected region.

18. The method of claim 17, wherein analyzing the one or more images to select the at least one region includes detecting the head of the user in the one or more images.

19. The method of claim 17, wherein analyzing the one or more images to select the at least one region includes detecting a horizon in the one or more images.

20. The method of claim 1, further comprising:
    after outputting at least part of the audio using the at least one of the plurality of speakers, analyzing, via the at least one processor, one or more subsequent images to determine at least one new indicator of head orientation of the user;
    selecting, via the at least one processor, another of the plurality of speakers based on the at least one new indicator of head orientation; and
    outputting, via the at least one processor, additional audio via the selected another of the plurality of speakers.

* * * * *